United States Patent
Oshima et al.

(10) Patent No.: US 6,871,125 B2
(45) Date of Patent: Mar. 22, 2005

(54) ELECTRIC VEHICLE STEERING/DRIVE CONTROL METHOD, ELECTRIC VEHICLE STEERING/DRIVE CONTROL APPARATUS, AND ELECTRIC VEHICLE

(75) Inventors: Hiroyasu Oshima, Kanazawa (JP); Kazuaki Baba, Kanazawa (JP); Katsuya Imai, Kanazawa (JP); Akihiro Yamada, Nonoichi-machi (JP)

(73) Assignee: Kanazawa Institute of Technology (JP)

( * ) Notice: Subject to any disclaimer, the term of this patent is extended or adjusted under 35 U.S.C. 154(b) by 74 days.

(21) Appl. No.: 10/294,113

(22) Filed: Nov. 14, 2002

(65) Prior Publication Data

US 2003/0105563 A1 Jun. 5, 2003

(30) Foreign Application Priority Data

Nov. 16, 2001 (JP) ........................................ 2001-351127

(51) Int. Cl.[7] .............................. B60T 8/32; B60L 15/20; B60K 8/00
(52) U.S. Cl. .............................. 701/22; 701/41; 180/204
(58) Field of Search .............................. 701/22, 41, 69, 701/89; 180/204, 408, 411, 421, 234, 410, 242, 244, 65.1, 65.3, 65.8, 446, 415

(56) References Cited

U.S. PATENT DOCUMENTS

| | | | |
|---|---|---|---|
| 5,348,111 A | * | 9/1994 | Williams et al. ............ 180/415 |
| 5,379,220 A | * | 1/1995 | Allen et al. .................... 701/41 |
| 5,404,960 A | * | 4/1995 | Wada et al. ................ 180/446 |
| 5,453,930 A | * | 9/1995 | Imaseki et al. ............... 701/22 |
| 5,465,806 A | * | 11/1995 | Higasa et al. ............... 180/165 |
| 5,996,722 A | * | 12/1999 | Price .......................... 180/403 |
| 6,449,552 B2 | * | 9/2002 | Ohba et al. ................... 701/89 |
| 6,549,835 B2 | * | 4/2003 | Deguchi et al. .............. 701/41 |

* cited by examiner

Primary Examiner—Tan Q. Nguyen
Assistant Examiner—Dalena Tran
(74) Attorney, Agent, or Firm—Brinks Hofer Gilson & Lione

(57) ABSTRACT

An electric vehicle steering/drive control method and apparatus having predetermined steering modes defining composite patterns of individual wheel travel paths, whereby the vehicle wheels are controlled independently. The steering modes are determined by different condition equations related to each composite pattern. A steering mode select signal is generated based on a mode selection by a vehicle driver. The steering mode select signal is received by a wheel steering angle computer and a wheel rotation speed computer. Based in part on the steering mode select signal, the wheel steering angle computer generates a signal that is received by a steering motor controller, which in turn controls motors that change the steering angle of the wheels. An actual angle sensor generates a signal based on the actual angle of the wheels and a steering angle comparator receives the actual angle sensor signal. In addition, to move the vehicle in a particular direction and at a particular speed, a speed and direction command signal is also generated based on driver input. This speed and direction command signal is received by a common signal rate of change suppression computer, which generates a signal received by the wheel steering angle computer and a wheel rotation speed computer. Then the wheel rotation speed computer generates a signal based on signals received from the common signal rate of change suppression computer and the steering angle comparator computer. A drive motor controller receives the wheel rotation speed signal and activates drive motors associated with each wheel, thereby causing the wheels to move rotationally.

28 Claims, 6 Drawing Sheets

ELECTRIC VEHICLE STEERING/DRIVE CONTROL METHOD, ELECTRIC VEHICLE STEERING/DRIVE CONTROL APPARATUS, AND ELECTRIC VEHICLE

BACKGROUND OF THE INVENTION

1. Field of the Invention

The present invention belongs to the field of steering and drive control systems used in electric, four-wheel-drive and four-wheel steering vehicles that have on-board battery power supplies, and that are operated at low speeds in various indoor and outdoor facilities other than public streets and highways, for example, hospitals and nursing homes, libraries, amusement parks, theme parks, sports and entertainment centers, offices, supply distribution bases, computer warehouses, large commercial facilities, etc. More specifically, the present invention is related to an electric vehicle steering/drive control method, a steering/drive system therefor, and an electric vehicle in which the steering and drive are controlled by this steering/drive system and method, wherein a variety of steering modes are provided and the driver selects from among these modes, the steering mode that is most appropriate for the instant driving conditions.

2. Description of Related Art

The elderly now constitute an ever-growing segment of society, and are using hospitals and nursing homes to an unprecedented extent. The number of wheelchair-bound individuals who are either hospital patients, or who use a variety of other facilities, also continues to grow. Along with this aging cross-section of society, medical treatment facilities and nursing facilities are tending to be much larger in size than they used to be. In addition, in the future, the elderly and handicapped are expected to play a more active role in society.

When considering the situation described above, one can reasonably predict a need for a variety of electric vehicles for supplementary transportation, not only for the elderly and handicapped, but also for other users of a wide variety of indoor and outdoor facilities that lack roadways. These facilities include hospitals, nursing homes, ordinary commercial and industrial facilities including supply distribution bases, computer warehouses, large commercial buildings, libraries, amusement parks, sports and entertainment facilities, and office buildings. Such transportation would be provided as a service to users of the facilities, and would also be provided to employees to improve efficiency in the day-to-day operation of the facilities. One can further reasonably predict that the future will bring a substantial need for various kinds of electric vehicles for moving packages, merchandise, etc., around various facilities at low speeds.

The vehicle passageways in such facilities are subject to a variety of constraints that are unique to each facility. Some of these constraints strongly influence requirements for steering and straight-running operation of vehicles within the facility, e.g., constraints on the width, area and shape of vehicle passageways in lobbies, waiting rooms, hallways and elevators; and the placement of structural objects such as pillars, walls and bordering structures at the edges of passageways. Therefore, a special need exists for vehicles that are used in such facilities that have steering capabilities that enable them to function well and move quickly to a given location and maneuver easily into a desired position under conditions imposed by the passageway constraints of the respective facility.

Passageways in such facilities are normally not wide enough, nor do they have enough driving area at intersections, to give conventional vehicles adequate room to run straight, pass, and turn left and right without difficulty. Also, with the limited amount of floor space available in cramped elevators, lobbies and waiting rooms, for vehicles operating under the severe passageway constraints of these spaces, there is a need for means for enabling a vehicle to quickly turn, change direction and move sideways to place itself in a desired position without striking any surrounding objects.

A survey of conventional electric cars, however, will reveal that none of them have the maneuverability to operate in this manner within the passageway constraints of the various types of facilities. There are indeed four-wheel-drive electric cars that are commonly known and offered for practical use. The steering mechanisms of all of these cars, however, use either Ackerman-type link mechanisms made up of knuckle arms, tie rods, etc., or mechanisms that depend on a mechanical structure using differential gears. Also, when steered into a turn, all of these conventional vehicles, have a wheel path pattern referred to as an "inside wheel difference" pattern, i.e., in the wheel travel path pattern formed by a vehicle turning left or right, the rear wheels fall to the inside of the arc traveled by the front wheels. Accordingly, if one of these conventional electric cars in which the wheels always inscribe an inside wheel difference pattern were to be put into use—not on an ordinary street, but in one of these facilities in which passageway constraints are imposed—the vehicle would be found incapable of easily turning, changing its direction, or moving sideways.

An object of the present invention, therefore, is to provide a four-wheel-drive electric vehicle steering/drive control whereby a number of different wheel travel path patterns can be realized to enable the vehicle to negotiate turns, changes in direction, and sideway movements swiftly and accurately under a variety of facility-specific passageway constraints to smoothly and quickly maneuver the vehicle into a desired position.

Another object of the present invention is to provide a steering control means wherein all steering and drive control functions can be accomplished entirely by electrical means, using no mechanical systems Ackerman-type link mechanisms, differential gears etc.; wherein a variety of steering control functions can be performed; and wherein the configuration of the steering control system is simple.

In such a system, the travel paths traced by the four wheels when the steering wheel is turned are not all the same. Therefore the steering angles and speeds-of-rotation of the wheels must be controlled according to the arc lengths of the travel paths of the respective wheels. Moreover, unless this control is exact, it can result in skidding or wheel-spinning during turns, and/or "toe-in" and "toe-out" when running straight. Toe-in is a condition in which the front edges of left and right wheels are closer than their rear edges; and toe-out is the opposite condition, wherein the rear edges are closer. Either condition can impede or prevent the forward travel of the vehicle. In the present invention such undesirable phenomena are prevented by providing theoretically exact control of steering angle and rotation speed.

In addition, in the present invention, the control system is designed so that no significant imbalance of drive power applied to the respective wheels will occur as a result of changes in effective tire diameter due to tire wear, changes in tire pressure, or changes in the load applied to the tire; and so that smooth steering and drive control will continue undisturbed even in the presence of abrupt changes in the vehicle speed and direction commands executed by the driver.

SUMMARY OF THE INVENTION

For the description of this application, it should be noted that the term "steering mode" denotes a given composite pattern of the travel paths of the individual wheels of an electric vehicle when turning the vehicle.

To solve the above-mentioned problem(s), the present invention provides a number of steering modes having different composite patterns of individual wheel travel paths for use in an electric vehicle. The vehicle driver selects one of these modes as being appropriate for the passageway constraints of the particular facility in which the electric vehicle is being driven. Then by commanding the vehicle speed and direction of travel, the driver can quickly and accurately perform maneuvers such as turning the vehicle right and left, changing the vehicle direction, and moving the vehicle sideways, all within the passageway constraints of the individual facility.

To solve the above-mentioned problems, the present invention provides a method to offset steering/drive control through separate steering and drive motors for each of a 4-wheeled vehicle's wheels. In addition, a plurality of different steering modes is prepared, each having a different composite pattern of wheel travel paths, and one of the prepared steering modes is selected as suitable for the current circumstances. A mode select signal for the selected steering mode and a vehicle speed/direction command signal are received by a wheel steering angle computation means and a wheel rotation speed computation means, and based on these signals, the rotation of each steering motor and drive motor is controlled such as to control the steering angle and rotation speed of each wheel in accordance with a condition equation required to perform steering/drive according to the selected steering mode.

Provided in this steering/drive control system of the electric vehicle are:

- a steering mode selection means for generating a steering mode select signal corresponding to the steering mode selected by a vehicle driver from among a plurality of different steering modes, each of which has a different composite pattern of the travel paths of the individual wheels;
- a vehicle speed/direction command means for generating a vehicle speed/direction command signal responsive to operations performed by the driver;
- a wheel steering angle computation means for receiving the steering mode select signal, and based on the vehicle speed and direction command signal, computing steering angles for each of the steering motors, in accordance with condition equations required to perform steering/drive according to the selected steering mode;
- a wheel rotation speed computation means for receiving the steering mode select signal and, based on the vehicle speed/direction command signal, computing rotation speeds for the drive motors in accordance with condition equations required for performing steering and drive according to the selected steering mode;
- a steering motor control means for controlling rotation of the steering motors, based on the computed steering angles; and
- a drive motor control means for controlling the rotation speeds of the drive motors, based on the computed rotation speeds.

The electric vehicle according to one embodiment of the present invention is a four-wheel-drive electric vehicle having a left front, right front, left rear and right rear wheel, a separate steering motor for separately steering each of the wheels, and a separate drive motor for separately rotationally driving each of the wheels. The vehicle also includes:

- a steering mode selection means for generating a steering mode select signal corresponding to the steering mode selected by a vehicle driver from among a plurality of different steering modes, each of which has a different composite pattern of the travel paths of the individual wheels;
- a vehicle speed/direction command means for generating a vehicle speed/direction command signal responsive to operations performed by the driver;
- a wheel steering angle computation means for receiving the steering mode select signal and, based on the vehicle speed and direction command signal, computing steering angles for each of the steering motors according to the condition equations required to perform steering/drive according to the selected steering mode;
- a wheel rotation speed computation means for receiving the steering mode select signal and, based on the vehicle speed/direction command signal, computing rotation speeds for the drive motors in accordance with condition equations required to perform steering/drive according to the selected steering mode;
- a steering motor control means for controlling rotation of the steering motors based on the computed steering angles; and
- a drive motor control means for controlling the rotation speeds of the drive motors based on the computed rotation speeds.

Also, proposed as examples of effective steering modes, are:

- an M1 steering mode wherein the travel paths of the right and left rear wheels follow the travel paths of the right and left front wheels, respectively;
- an M2 steering mode wherein the travel paths of the front and rear wheels lie parallel to each other;
- an M3 steering mode wherein the rear wheel turning path relative to the front wheel turning path is an inside wheel difference path;
- an M4 steering mode wherein the vehicle turns to the right with the right rear wheel as the center of rotation of the turn, and turns to the left with the left rear wheel as the center of rotation of the turn; and
- an M5 steering mode wherein the vehicle turns to the right with the right front wheel as the center of rotation of the turn, and turns to the left with the left front wheel as the center of rotation of the turn.

Also, disclosed for each of these steering modes are condition equations for defining steering angles and rotation speeds for each of the wheels such that a rich variety of driving maneuvers can be accurately performed by controlling the steering angles and rotation speeds of the wheels so that they always satisfy the condition equations for the selected mode.

According to one embodiment of the present invention, the condition equations for the steering angles and rotation speeds of each of the wheels are expressed as indicated below. That is, in the condition equations used to express the relationships necessary between the steering angles and rotation speeds of the wheels to perform steering/drive according to the M1, M2, M3, M4 and M5 steering modes, the steering angles for the right front, left front, right rear, and left rear wheels are designated $\alpha 1$, $\alpha 2$, $\alpha 3$, and $\alpha 4$, respectively. Additionally, the wheel rotation speeds for the right front, left front, right rear, and left rear wheels are designated n1, n2, n3, and n4, respectively. Also, as shown in detail in FIGS. 3, 5, 6 and 7, the distance between each wheel and a center line X between the front wheels and rear wheels is designated as L; the distance between each wheel and a center line Y between the right wheels and the left wheels is designated as W. Also, for the case in which the turning paths of the wheels inscribe concentric arcs (see FIG. 3) the distance between the center point P5 of the concentric arcs and a point O that is central to the locations of the four wheels is designated as R.

With terms as defined above, the condition equations required to perform steering/drive according to the M1 steering mode can be expressed as the following condition equations:

$$\alpha_1 = -\alpha_3 = \tan^{-1}\left(\frac{L}{R-W}\right)$$

$$\alpha_2 = -\alpha_4 = \tan^{-1}\left(\frac{L}{R+W}\right)$$

$$n_1:n_2:n_3:n_4 = \sqrt{(R-W)^{2}+L^{2}}:\sqrt{(R+W)^{2}+L^{2}}:\sqrt{(R-W)^{2}+L^{2}}:\sqrt{(R+W)^{2}+L^{2}}$$

The condition equations required to perform steering/drive according to the M2 steering mode can be expressed as the following condition equations:

$$\alpha 1 = \alpha 2 = \alpha 3 = \alpha 4$$

$$n1 = n2 = n3 = n4.$$

The condition equations required to perform steering/drive according to the M3 steering mode can be expressed as the following condition equations:

$$\alpha_1 = \tan^{-1}\left(\frac{2L}{R-W}\right)$$

$$\alpha_2 = \tan^{-1}\left(\frac{2L}{R+W}\right)$$

$$\alpha_3 = \alpha_4 = 0$$

$$n_1:n_2:n_3:n_4 = \sqrt{(R-W)^{2}+(2L)^{2}}:\sqrt{(R+W)^{2}+(2L)^{2}}:|R-W|:|R+W|.$$

The condition equations required to perform steering/drive according to the M4 steering mode can be expressed as the following condition equations:

$$\alpha_1 = \frac{\pi}{2}$$

$$\alpha_2 = \tan^{-1}\left(\frac{L}{W}\right)$$

$$\alpha_3 = \alpha_4 = 0$$

$$n_1:n_2:n_3:n_4 = L:\sqrt{W^{2+L^2}}:0:W \text{ for clockwise, right turns;}$$

and $$\alpha_1 = \tan^{-1}\left(-\frac{L}{W}\right)$$

$$\alpha_2 = -\frac{\pi}{2}$$

$$\alpha_3 = \alpha_4 = 0 \quad n_1:n_2:n_3:n_4 = \sqrt{W^{2+L^2}}:L:W:0 \text{ for counter-clockwise, left turns.}$$

The condition equations required to perform steering/drive according to the M5 steering mode can be expressed as the following condition equations:

$$\alpha_1 = \alpha_2 = 0$$

$$\alpha_3 = -\frac{\pi}{2}$$

$$\alpha_4 = \tan^{-1}\left(-\frac{L}{W}\right)$$

$$n_1:n_2:n_3:n_4 = 0:W:L:\sqrt{W^{2+L^2}} \text{ for clockwise, right turns;}$$

and $$\alpha_1 = \alpha_2 = 0$$

$$\alpha_3 = \tan^{-1}\left(\frac{L}{W}\right)$$

$$\alpha_4 = \frac{\pi}{2}$$

$$n_1:n_2:n_3:n_4 = W:0:\sqrt{W^{2+L^2}}:L \text{ for counter-clockwise, left turns.}$$

The condition equations that define relationships with respect to the steering angles $\alpha 1$, $\alpha 2$, $\alpha 3$, and $\alpha 4$ are written in terms of $\tan^{-1}$ Since the trigonometric functions tan, sin, cos, cot, cosec, and sec are all interrelated by specific relational expressions, however, any of these condition equations expressed using $\tan^{-1}$ can also be expressed using $\sin^{-1}$ $\cos^{-1}$, $\cot^{-1}$, $\csc^{-1}$, and $\sec^{-1}$. One of skill in the art would therefore understand that values computed for the steering angles $\alpha 1$, $\alpha 2$, $\alpha 3$, and $\alpha 4$, and rotation speeds n1, n2, n3, and n4 of the four wheels, will be the same, regardless of whether those computations were based on a condition equation expressed in terms of $\tan^{-1}$, or a condition equation using one of the other trigonometric functions. Accordingly, if a first conditional equation expressed using $\sin^{-1}$ $\cos^{-1}$, $\cot^{-1}$, $\csc^{-1}$, or $\sec^{-1}$, can be converted based on a relational expression relating the trigonometric functions to each other to a second condition equation disclosed in the present application, expressed using $\tan^{-1}$, then the first equation shall be construed as equivalent to the second conditional equation of the present invention expressed in terms of $\tan^{-1}$.

For example, considering that $$\tan\alpha = \sqrt{\frac{1}{\cos^2\alpha} - 1} = \sqrt{\frac{1}{1-\sin^2\alpha} - 1},$$

it follows that the condition equations required to perform steering/drive according to the M1 steering mode can be can be rewritten as follows:

$$\alpha_1 = -\alpha_3 = \tan^{-1}\left(\frac{L}{R-W}\right) = \sin^{-1}\pm\left(\frac{L}{\sqrt{(R-W)^2+L^2}}\right)$$

$$= \cos^{-1}\left(\frac{R-W}{\sqrt{(R-W)^2+L^2}}\right) = \cot^{-1}\left(\frac{R-W}{L}\right)$$

$$= \operatorname{cosec}^{-1}\pm\left(\frac{\sqrt{(R-W)^2+L^2}}{L}\right) = \sec^{-1}\left(\frac{\sqrt{(R-W)^2+L^2}}{R-W}\right)$$

$$\alpha_2 = -\alpha_4 = \tan^{-1}\left(\frac{L}{R+W}\right) = \sin^{-1}\pm\left(\frac{L}{\sqrt{(R+W)^2+L^2}}\right)$$

$$= \cos^{-1}\left(\frac{R+W}{\sqrt{(R+W)^2+L^2}}\right) = \cot^{-1}\left(\frac{R+W}{L}\right)$$

$$= \operatorname{cosec}^{-1}\pm\left(\frac{\sqrt{(R+W)^2+L^2}}{L}\right) = \sec^{-1}\left(\frac{\sqrt{(R+W)^2+L^2}}{R+W}\right).$$

Similarly, the condition equations required to perform steering/drive according to any of the steering modes M3, M4, and M5 can be expressed as a condition equation using $\tan^{-1}$, $\sin^{-1}$ $\cos^{-1}$, $\cot^{-1}$, $\operatorname{cosec}^{-1}$, or $\sec^{-1}$. Regardless of the trigonometric used, however, each of these condition equations constitutes an equation that can be expressed as a conditional equation using $\tan^{-1}$.

Also, there may well be facilities having passageway constraints that are substantially uniform throughout the entire facility, but that cannot be satisfied by the wheel travel path pattern of conventional four-wheel-drive electric vehicles. It is also possible, however, that these constraints for the entire facility could be satisfied by one specific steering mode. In such cases, one need not necessarily provide a plurality of modes, but could instead specify a single mode that would meet the passageway constraints for the entire facility, thus simplifying vehicle operation while also reducing cost. For such a facility, the present invention can provide a steering/drive control method with only one particular steering mode that satisfies the conditions imposed by the passageway constraints of the facility. In such a case, the rotation of the steering and drive motors of the four wheels are controlled in accordance with the condition equation for that particular mode. One embodiment of the present invention also provides a steering/drive control system for executing one of the steering modes M1, M2, M3, M4 and M5, and an electric vehicle in which this control system is installed.

One embodiment of the present invention is an electric vehicle steering/drive control method for an electric vehicle in which steering/drive control is effected through separate steering and drive motors for each of a left front, right front, left rear and right rear wheel. In this method, a plurality of different steering modes are prepared, comprising at least one of an M1 steering mode wherein the travel paths of the right and left rear wheels follow the travel paths of the right and left front wheels, respectively; an M2 steering mode wherein the travel paths of the front and rear wheels lie parallel to each other; an M3 steering mode wherein the rear wheel turning path relative to the front wheel turning path is an inside wheel difference path; an M4 steering mode wherein the vehicle turns to the right with the right rear wheel as the center of rotation of the turn, and turns to the left with the left rear wheel as the center of rotation of the turn; and an M5 steering mode wherein the vehicle turns to the right with the right front wheel as the center of rotation of the turn, and turns to the left with the left front wheel as the center of rotation of the turn; one of the steering modes is selected as suitable for the circumstances; a mode select signal for the selected steering mode and a vehicle speed/direction command signal are received; and the rotation of each steering motor and drive motor is controlled to control the steering angle and rotation speed of each wheel in accordance with an equation for the steering/drive conditions required to conform to the selected steering mode.

Another embodiment of the present invention is an electric vehicle steering/drive control system wherein steering/drive control is effected through separate steering and drive motors for each of a left front, right front, left rear and right rear wheel, comprising: a steering mode selection means, for generating a steering mode select signal corresponding to a steering mode selected by a vehicle driver from among a plurality of different steering modes, comprising at least one of an M1 steering mode wherein the travel paths of the right and left rear wheels follow the travel paths of the right and left front wheels, respectively; an M2 steering mode wherein the travel paths of the front and rear wheels lie parallel to each other; an M3 steering mode wherein the rear wheel turning path relative to the front wheel turning path is an inside wheel difference path; an M4 steering mode wherein the vehicle turns to the right with the right rear wheel as the center of rotation of the turn, and turns to the left with the left rear wheel as the center of rotation of the turn; and an M5 steering mode wherein the vehicle turns to the right with the right front wheel as the center of rotation of the turn, and turns to the left with the left front wheel as the center of rotation of the turn; a vehicle speed/direction command means, for generating a vehicle speed/direction command signal responsive to operations performed by the driver; a wheel steering angle computation means, for receiving the steering mode select signal, and based on the vehicle speed and direction command signal, computing steering angles for each of the steering motors, in accordance with condition equations required to perform steering/drive according to the selected steering mode; a wheel rotation speed computation means, for receiving the steering mode select signal and, based on the vehicle speed/direction command signal, computing rotation speeds for the drive motors in accordance with condition equations required to perform steering/drive according to the selected steering mode; a steering motor control means, for controlling rotation of the steering motors, based on the computed steering angles; and a drive motor control means, for controlling the rotation speeds of the drive motors, based on the computed rotation speeds.

Another embodiment of the present invention is an electric vehicle that has a left front, right front, left rear and right rear wheel, a separate steering motor for separately steering each of the wheels, and a separate drive motor for separately rotationally driving each of the wheels. This embodiment further comprises: a steering mode selection means, for generating a steering mode select signal corresponding to one steering mode selected by a vehicle driver from among a plurality of different steering modes, comprising at least one of an M1 steering mode wherein the travel paths of the right and left rear wheels follow the travel paths of the right and left front wheels, respectively; an M2 steering mode wherein the travel paths of the front and rear wheels lie parallel to each other; an M3 steering mode wherein the rear wheel turning path relative to the front wheel turning path is an inside wheel difference path; an M4 steering mode wherein the vehicle turns to the right with the right rear wheel as the center of rotation of the turn, and turns to the left with the left rear wheel as the center of rotation of the turn; and an M5 steering mode wherein the vehicle turns to the right with the right front wheel as the center of rotation of the turn, and turns to the left with the left front wheel as the center of rotation of the turn; a vehicle speed/direction command means, for generating a vehicle speed/direction command signal responsive to operations performed by the driver; a wheel steering angle computation means for receiving the steering mode select signal and, based on the vehicle speed and direction command signal, computing steering angles for each of the steering motors according to the condition equations required to perform steering/drive according to the selected steering mode; a wheel rotation speed computation means, for receiving the steering mode select signal and, based on the vehicle speed/direction command signal, computing rotation speeds for the drive motors in accordance with condition equations required to perform steering/drive according to the selected steering mode; a steering motor control means, for controlling rotation of the steering motors, based on the computed steering angles; and a drive motor control means, for controlling the rotation speeds of the drive motors, based on the computed rotation speeds.

In the condition equations used to express the relationships that must exist between the steering angles and rotation speeds of the wheels to perform steering/drive according to the M1, M2, M3, M4 and M5 steering modes, the steering angles for the right front, left front, right rear, and left rear wheels, are designated $\alpha 1$, $\alpha 2$, $\alpha 3$, and $\alpha 4$, respectively; and the wheel rotation speeds for the right front, left front, right rear, and left rear wheels, are designated n1, n2, n3, and n4, respectively. Also, referring to FIGS. 3, 5, 6 and 7, the distance between each wheel and a center line X between the front wheels and rear wheels is designated as L; and the distance between each wheel and a center line Y between the right wheels and the left wheels is designated as W. Also, for the case wherein the turning paths of the wheels inscribe concentric arcs (see FIG. 3) the distance between the center point P5 of the concentric arcs and a point O that is central to the locations of the four wheels is designated as R.

With terms as defined above, the condition equations required, i.e., the relationships that must exist, to perform steering/drive according to the M1 steering mode can be expressed as the following condition equations (or by equations that are expressed in a different form but that can be converted to the form of the following equations):

$$\alpha_1 = -\alpha_3 = \tan^{-1}\left(\frac{L}{R-W}\right)$$

$$\alpha_2 = -\alpha_4 = \tan^{-1}\left(\frac{L}{R+W}\right)$$

$$n_1:n_2:n_3:n_4 = \sqrt{(R-W)^2+L^2}:\sqrt{(R+W)^2+L^2}:\sqrt{(R-W)^2+L^2}:\sqrt{(R+W)^2+L^2}$$

The condition equations required to perform steering/drive according to the M2 Steering mode can be expressed as the condition equations $\alpha 1 = \alpha 2 = \alpha 3 = \alpha 4$ n1=n2=n3=n4.

The condition equations required to perform steering/drive according to the M3 steering mode can be expressed as the condition equations $$\alpha_1 = \tan^{-1}\left(\frac{2L}{R-W}\right)$$

$$\alpha_2 = \tan^{-1}\left(\frac{2L}{R+W}\right)$$

$\alpha_3 = \alpha_4 = 0$ $n_1:n_2:n_3:n_4 = \sqrt{(R-W)^2+(2L)^2}:\sqrt{(R+W)^2+(2L)^2}:|R-W|:|R+W|$.

The condition equations required to perform steering/drive according to the M4 steering mode can be expressed as the condition equations $$\alpha_1 = \frac{\pi}{2}$$

$$\alpha_2 = \tan^{-1}\left(\frac{L}{W}\right)$$

$\alpha_3 = \alpha_4 = 0$ $n_1:n_2:n_3:n_4 = L:\sqrt{W^2+L^2}:0:W$ for clockwise, right turns;

and $$\alpha_1 = \tan^{-1}\left(-\frac{L}{W}\right)$$

$$\alpha_2 = -\frac{\pi}{2}$$

$\alpha_3 = \alpha_4 = 0$ $n_1:n_2:n_3:n_4 = \sqrt{W^2+L^2}:L:W:0$ for counter-clockwise, left turns.

The condition equations required to perform steering/drive according to the M5 Steering mode can be expressed as the condition equations $\alpha_1 = \alpha_2 = 0$ $$\alpha_3 = -\frac{\pi}{2}$$

$$\alpha_4 = \tan^{-1}\left(-\frac{L}{W}\right)$$

$n_1:n_2:n_3:n_4 = 0:W:L:\sqrt{W^2+L^2}$ for clockwise, right turns;

and $\alpha_1 = \alpha_2 = 0$ $$\alpha_3 = \tan^{-1}\left(\frac{L}{W}\right)$$

$$\alpha_4 = \frac{\pi}{2}$$

$n_1:n_2:n_3:n_4 = W:0:\sqrt{W^2+L^2}:L$ for counter-clockwise, left turns.

Another embodiment of the present invention is an electric vehicle steering/drive control method for an electric vehicle wherein steering/drive control is effected through separate steering and drive motors for each of a left front, right front, left rear and right rear wheel, comprising specifying and using only one specific steering mode, from among an M1 steering mode wherein the travel paths of the right and left rear wheels follow the travel paths of the right and left front wheels, respectively; an M2 steering mode wherein the travel paths of the front and rear wheels lie parallel to each other; an M3 steering mode wherein the rear wheel turning path relative to the front wheel turning path is an inside wheel difference path; an M4 steering mode wherein the vehicle turns to the right with the right rear wheel as the center of rotation of the turn, and turns to the left with the left rear wheel as the center of rotation of the turn; and an M5 steering mode wherein the vehicle turns to the right with the right front wheel as the center of rotation of the turn, and turns to the left with the left front wheel as the center of rotation of the turn; receiving a vehicle speed/direction command signal; and controlling the rotation of each steering motor and drive motor such as to control the steering angle and rotation speed of each wheel in accordance with the condition equations required to perform steering/drive according to said one specific steering mode.

Another embodiment of the present invention is an electric vehicle steering/drive control system for controlling an electric vehicle in which steering/drive control is effected through separate steering and drive motors for each of a left front, right front, left rear and right rear wheel, comprising a vehicle speed/direction command means for generating a vehicle speed/direction command signal responsive to operations performed by a driver; a wheel steering angle computation means for computing, based on the vehicle speed/direction command signal, steering angles for the steering motors in accordance with condition equations required to perform steering/drive according to one specific steering mode only, from among an M1 steering mode wherein the travel paths of the right and left rear wheels follow the travel paths of the right and left front wheels, respectively; an M2 steering mode wherein the travel paths of the front and rear wheels lie parallel to each other; an M4 steering mode wherein the vehicle turns to the right with the right rear wheel as the center of rotation of the turn, and turns to the left with the left rear wheel as the center of rotation of the turn; and an M5 steering mode wherein the vehicle turns to the right with the right front wheel as the center of rotation of the turn, and turns to the left with the left front wheel as the center of rotation of the turn; a wheel rotation speed computation means for computing, based on the vehicle speed and direction command signal, rotation speeds for each of the drive motors, in accordance with the condition equations required to perform steering/drive according to said one specific steering mode only; a steering motor control means, for controlling rotation of the steering motors based on the computed steering angles; and a drive motor control means, for controlling the rotation speeds of the drive motors based on the computed rotation speeds.

Another embodiment of the present invention is an electric vehicle that has a left front, right front, left rear and right rear wheel, a separate steering motor for separately steering each of the wheels, and a separate drive motor for separately rotationally driving each of the wheels, and comprises a vehicle speed/direction command means, for generating a vehicle speed/direction command signal responsive to operations performed by the driver; a wheel steering angle computation means for computing, based on the vehicle speed/direction command signal, steering angles for the steering motors, in accordance with condition equations required to perform steering/drive according to one specific steering mode only, from among an M1 steering mode wherein the travel paths of the right and left rear wheels follow the travel paths of the right and left front wheels, respectively; an M2 steering mode wherein the travel paths of the front and rear wheels lie parallel to each other; an M4 steering mode wherein the vehicle turns to the right with the right rear wheel as the center of rotation of the turn, and turns to the left with the left rear wheel as the center of rotation of the turn; and an M5 steering mode wherein the vehicle turns to the right with the right front wheel as the center of rotation of the turn, and turns to the left with the left front wheel as the center of rotation of the turn; a wheel rotation speed computation means for computing, based on the vehicle speed and direction command signal, rotation speeds for each of the drive motors, in accordance with the condition equations required to perform steering/drive according to said one specific steering mode only; a steering motor control means, for controlling rotation of the steering motors based on the computed steering angles; and a drive motor control means, for controlling the rotation speeds of the drive motors based on the computed rotation speeds.

BRIEF DESCRIPTION OF THE SEVERAL VIEWS OF THE DRAWINGS

These and other features, aspects, and advantages of the present invention will become apparent with reference to the following description, claims, and accompanying drawings, where

DETAILED DESCRIPTION

Figure 1:
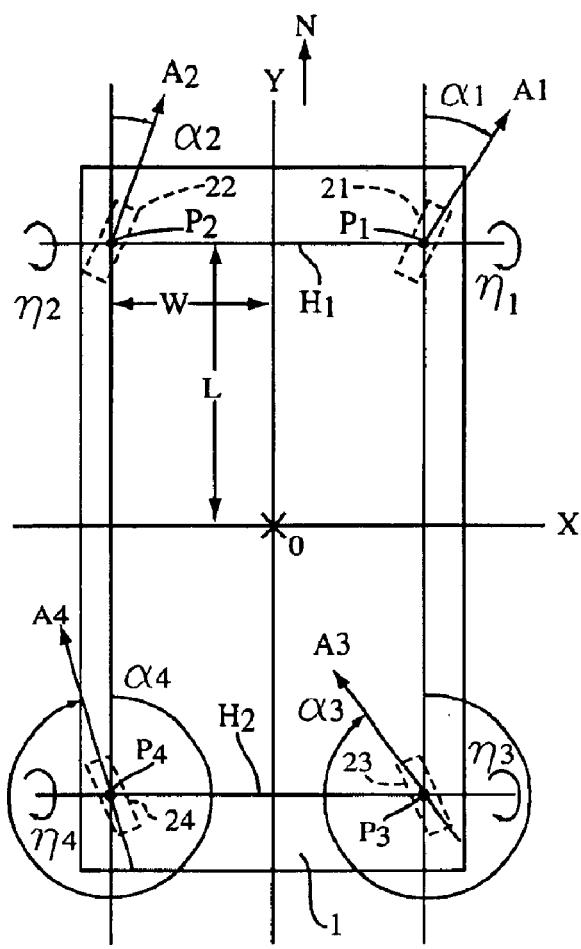
FIG. 1 is a plan view showing the basic configuration of the body base of an electric vehicle according to the present invention.
Figure 2:
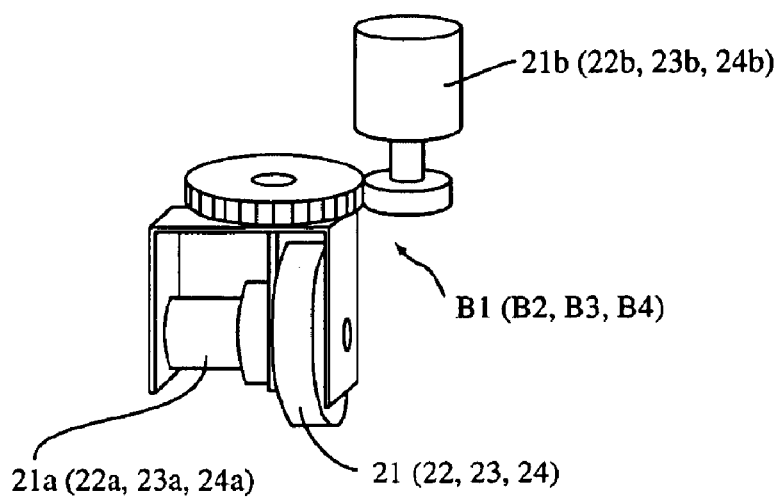
FIG. 2 is an oblique view of a wheel drive/steering block installed on the body base of FIG. 1.

In the following paragraphs, the present invention will be described with reference to drawings showing an embodiment thereof. FIG. 1 is a plan view showing the basic configuration of a body base of the electric vehicle of the present invention. FIG. 2 is an oblique view of a steering/drive block that is installable on the body base of FIG. 1. Shown in FIG. 1 are an electric vehicle body base 1; points P1 and P2, indicating the locations at which the two front wheels, right and left, respectively, are installed on the under surface of the base body 1; and points P3 and P4, indicating the positions at which the two rear wheels, right and left, respectively, are installed on the under surface of the base body 1. Also shown are a right front wheel 21, a left front wheel 22, a right rear wheel 23, and a left rear wheel 24. An arrow N indicates the straight-forward direction of travel of the vehicle. Points P1, P2, P3, and P4, the locations of the wheels 21–24, lie at the intersections of the sides of a rectangle having a center point O, i.e., the center relative to the points P1, P2, P3, and P4. It will be assumed, for the purpose of explanation, that an X axis and a Y axis passing through the center point O are orthogonal coordinate axes.

The X axis forms a center line between the front wheels 21 and 22 and rear wheels 23 and 24; and the Y axis forms a center line between the right wheels 21 and 23 and left wheels 22 and 24. Also, the Y axis lies in the direction of straight forward travel of the vehicle, which is the direction indicated by the arrow N. The points P1 and P2 are connected by a front wheel axis line H11, which would correspond to an axle for the front wheels 21 and 22. The points P3 and P4 are connected by a rear wheel axis line H2, which would correspond to an axle for the front wheels 23 and 24. A distance L is the distance between the X axis and the points P1, P2, P3, and P4; and a distance W is the distance between the Y axis and the points P1, P2, P3, and P4.

The speeds of rotation of the right front wheel 21, the left front wheel 22, the right rear wheel 23 and the left rear wheel 24, when the vehicle is under driving control, are represented by n1, n2, n3, and n4, respectively; and the steering angles of the right front wheel 21, the left front wheel 22, the right rear wheel 23 and the left rear wheel 24, when the vehicle is under driving control, are represented by $\alpha 1$, $\alpha 2$, $\alpha 3$, and $\alpha 4$, respectively. Also, the pointing directions (direction of travel) of the right front wheel 21, the left front wheel 22, the right rear wheel 23 and the left rear wheel 24, when the vehicle is under driving control, are represented by A1, A2, A3, and A4, respectively.

When the vehicle is under driving control, each individual rotation speed n1, n2, n3, n4 and steering angle $\alpha 1$, $\alpha 2$, $\alpha 3$, $\alpha 4$ of the wheels 21–24, is individually and independently controlled. To accomplish this, each of the wheels 21–24 is provided a separate steering/drive block B1, B2, B3, and B4, respectively. As shown in FIG. 2, each of the drive blocks comprises a drive motor 21a, 22a, 23a, and 24a for controlling speed of rotation, and a steering motor 21b, 22b, 23b, and 24b, for controlling steering angle, both of which are appropriately coupled to the wheel in that block. The steering/drive blocks B1, B2, B3, and B4 are mounted, along with their wheels 21–24 on the under-surface of the body base 1 at the locations P1, P2, P3, and P4, respectively. The actual direction of travel, the actual steering angles $\alpha 1$, $\alpha 2$, $\alpha 3$, and $\alpha 4$, of the wheels 21–24 when the vehicle is under driving control, are detected by steering angle sensors 3, not shown in FIG. 1. The steering angle sensors 3 provide detection feedback signals to a control system that uses the signals to maintain steering/drive control according to the driver's commands. A steering angle sensor 3 is provided for each of the steering motors 21b, 22b, 23, and 24b.

The electric vehicle of the above embodiment, its steering/drive control method, and its steering/drive control system are characterized in that steering modes having different composite patterns of individual wheel travel paths are prepared and set in advance; a driver then selects one of these modes as appropriate for the passageway constraints of the particular facility in which the electric vehicle being driven. Thereafter, by commanding vehicle speed and direction of travel, the driver can quickly and accurately perform maneuvers such as turning the vehicle right and left, changing the vehicle direction, and moving the vehicle sideways, all according to the individual passageway constraints of the facility.

Five steering modes, designated M1, M2, M3, M4, and M5 are prepared for the electric vehicle of the embodiment of the invention described above. Also, incorporated into the vehicle's electric vehicle steering/drive system, are a wheel steering angle computation means, computer, and a wheel rotation speed computation means, computer, with programs for computing all of the steering angles and rotation speeds required for each wheel, to realize each of the steering modes.

Figure 3:
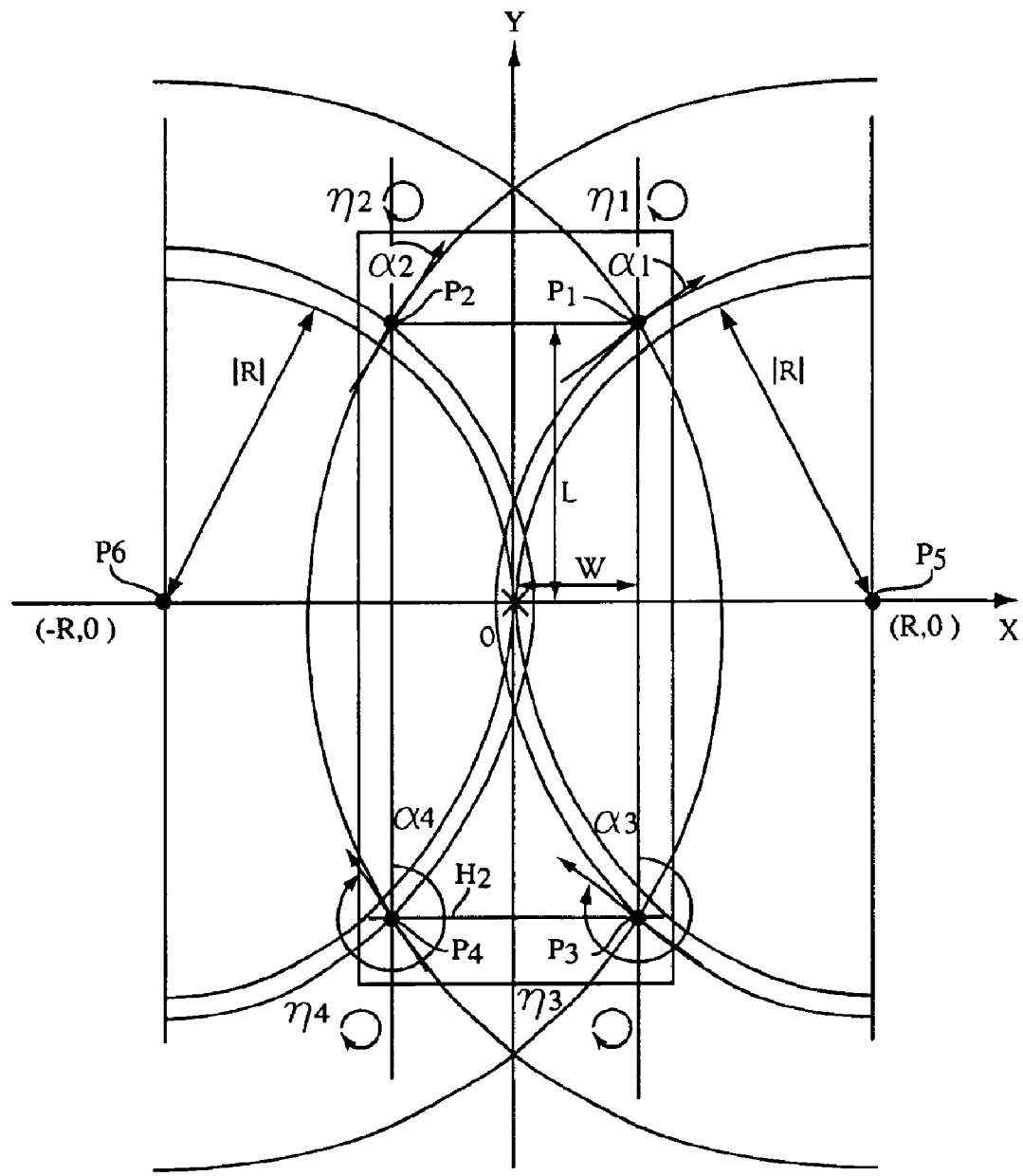
FIG. 3 is a drawing for explaining steering mode M1.

As shown in FIG. 1 and FIG. 3, the steering mode M1 is a mode such that the front wheels 21 and 22 steering angles $\alpha 1$ and $\alpha 2$, and the rear wheel(s) 23 and 24 steering angles $\alpha 3$ and $\alpha 4$, are set to opposite, left-right, directions relative to the direction in which the vehicle is traveling, to cause the wheel travel paths of the rear wheels 23 and 24 to follow in the travel paths of the front wheels 21 and 22, respectively. In FIG. 3, a point P5 at x, y coordinates (R,0) indicates the "center-of-turn" when the vehicle is making a right, clockwise turn; and a point P6 at x, y coordinates (−R, 0) indicates the "center-of-turn" when the vehicle is making a left, counter-clockwise turn. In steering mode M1, as shown in FIG. 3, the turning travel paths of the wheels 21–24 are concentric arcs, with the points P5 and P6 at the centers of the concentric arcs. Moreover, as will become apparent upon further study of FIG. 3, to operate in steering mode M1 for steering angles $\alpha 1$ and $\alpha 2$ under conditions as listed in Table 1, the steering angles $\alpha 1$, $\alpha 2$, $\alpha 3$, and $\alpha 4$ and rotation speeds n1, n2, n3, and n4 of the wheels 21–24, respectively, must satisfy the condition equations (E11), (E12), and (E13).

TABLE 1

| | Steering Angle | |
|---|---|---|
| Conditions | $\alpha 1$ | $\alpha 2$ |
| $W \leq |R|$ | $-\frac{\pi}{2} < \alpha_1 \leq \frac{\pi}{2}$ | $-\frac{\pi}{2} \leq \alpha_2 < \frac{\pi}{2}$ |
| $0 \leq R < W$ (CW) | $\frac{\pi}{2} < \alpha_1 < \pi$ | $0 < \alpha_2 < \frac{\pi}{2}$ |
| $-W < R \leq 0$ (CCW) | $-\frac{\pi}{2} < \alpha_1 < 0$ | $-\pi < \alpha_2 < -\frac{\pi}{2}$ |

$$\alpha_1 = -\alpha_3 = \tan^{-1}\left(\frac{L}{R-W}\right) \quad (E11)$$

$$\alpha_2 = -\alpha_4 = \tan^{-1}\left(\frac{L}{R+W}\right) \quad (E12)$$

$$n_1:n_2:n_3:n_4 = \sqrt{(R-W)^2+L^2}:\sqrt{(R+W)^2+L^2}:\sqrt{(R-W)^2+L^2}:\sqrt{(R+W)^2+L^2} \quad (E13)$$

Figure 4:
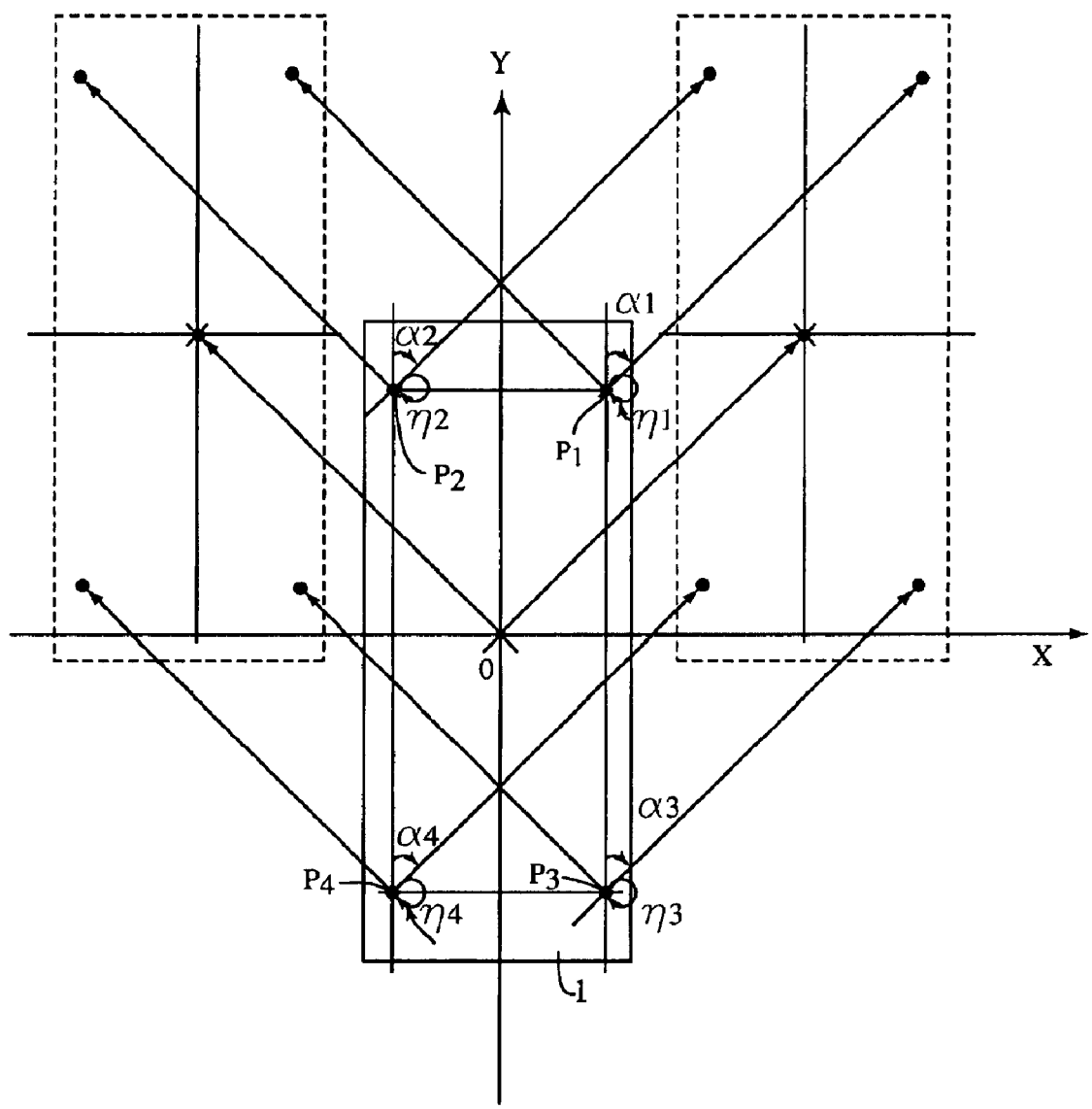
FIG. 4 is a drawing for explaining steering mode M2.

In steering mode M2, as shown in FIG. 4, the front wheel steering angles $\alpha 1$ and $\alpha 2$ and rear wheel steering angles $\alpha 3$ and $\alpha 4$ are all set to the same direction and same angle, thus producing a travel path pattern in which the travel paths of the rear wheels lie parallel to the travel paths of the front wheels, thus causing the vehicle to perform an oblique parallel move to the right or left. As will be apparent from FIG. 4, to drive the vehicle in steering mode M2, the respective steering angles $\alpha 1$, $\alpha 2$, $\alpha 3$, and $\alpha 4$, and wheel rotation speeds n1, n2, n3, and n4 must satisfy the condition equations (E21), and (E22):

$$\alpha_1 = \alpha_2 = \alpha_3 = \alpha_4 \quad (E21)$$

$$n_1 = n_2 = n_3 = n_4. \quad (E22)$$

Figure 5:
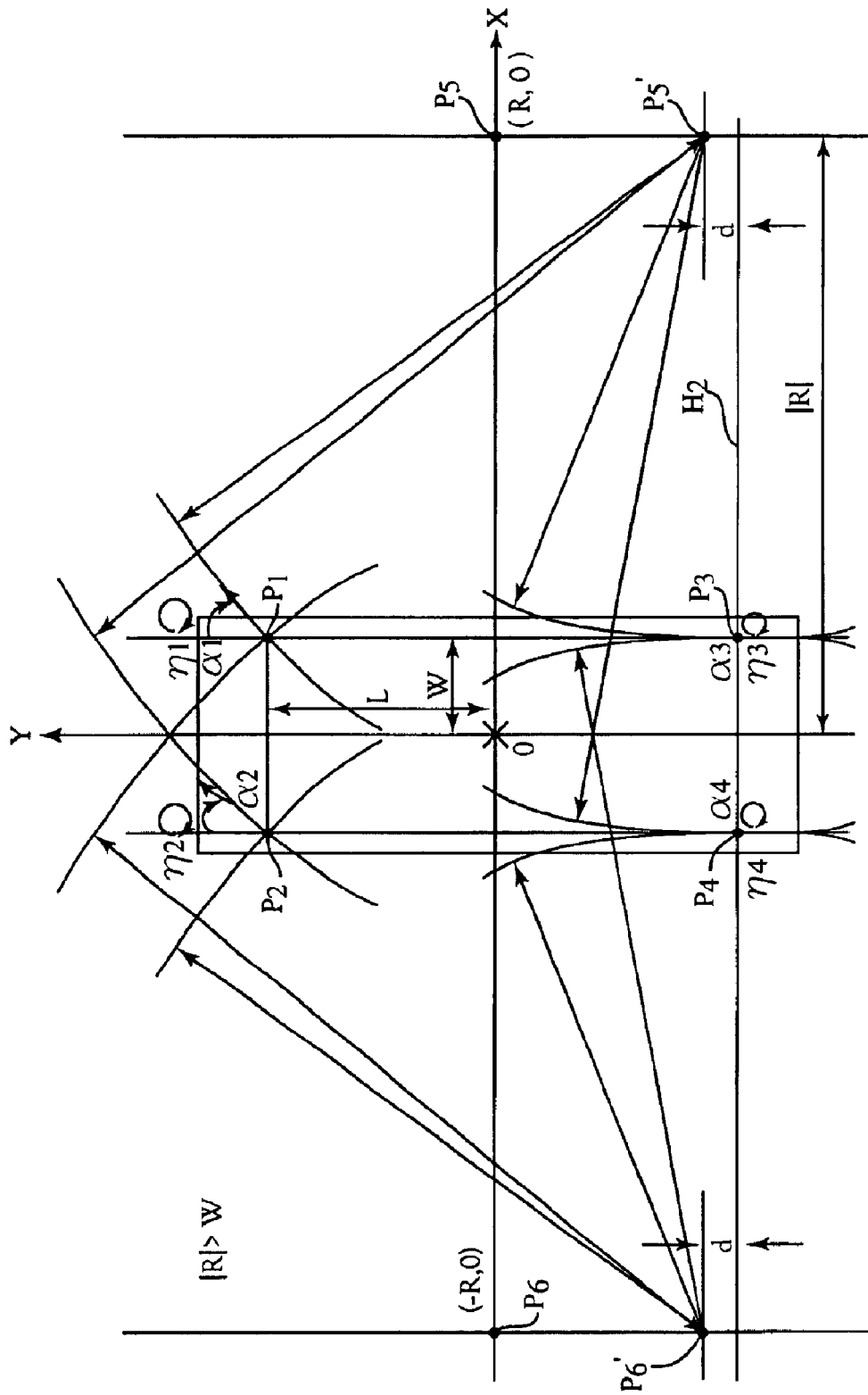
FIG. 5 is a drawing for explaining steering mode M3.

Steering mode M3, as shown in FIG. 5, is a mode in which only the front wheels, steering angles $\alpha 1$ and $\alpha 2$, are steered as is the case in a conventional automobile. The travel paths of the front and rear wheels therefore inscribe inside wheel difference patterns therebetween. As is apparent from FIG. 5, to operate in steering mode M3, the steering angles $\alpha 1$, $\alpha 2$, $\alpha 3$, and $\alpha 4$ and rotation speeds n1, n2, n3, and n4 of the wheels must satisfy the condition equations (E31), (E32), (E33), and (E34). Also, as shown in FIG. 5, the right turn center point P5' and left turn center point P6' are both separated from the rear wheel axis line H2 by a distance d. At low vehicle speeds, it may be assumed that d≈0.

$$\alpha_1 = \tan^{-1}\left(\frac{2L}{R-W}\right) \quad (E31)$$

$$\alpha_2 = \tan^{-1}\left(\frac{2L}{R+W}\right) \quad (E32)$$

$$\alpha_3 = \alpha_4 = 0 \quad (E33)$$

where $$-\frac{\pi}{2} < \alpha_1 < \frac{\pi}{2}, -\frac{\pi}{2} < \alpha_2 < \frac{\pi}{2}, W < |R|$$

$$n_1:n_2:n_3:n_4 = \sqrt{(R-W)^2+(2L)^2}:\sqrt{(R+W)^2+(2L)^2}|R-W|:|R+W| \quad (E34)$$

where it is assumed that d=0 because the vehicle is operated at low speed.

Figure 6:
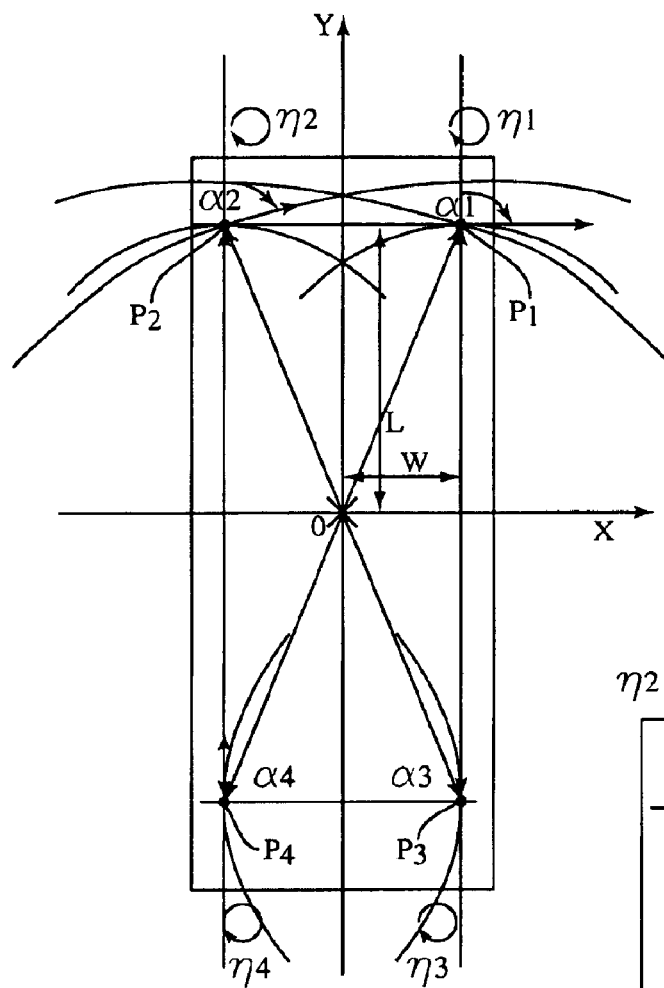
FIG. 6 is a drawing for explaining steering mode M.

Steering mode M4, as shown in FIG. 6, is a mode in which the vehicle makes right, clockwise turns with the right rear wheel point P3 as center-of-turn, and makes left, counter-clockwise turns with the left rear wheel point P4 as center-of-turn. As is apparent from FIG. 6, to operate in steering mode M4, the steering angles α1, α2, α3, and α4 and rotation speeds n1, n2, n3, and n4 of the wheels must satisfy the condition equations (E41), (E42), (E43), (E44), (E45), (E46), (E47), and (E48).

When the vehicle is turned clockwise, with the right rear wheel point P3 as center-of-turn, $$\alpha_1 = \frac{\pi}{2} \quad (E41)$$

$$\alpha_2 = \tan^{-1}\left(\frac{L}{W}\right) \quad (E42)$$

where $$0 < \alpha_2 < \frac{\pi}{2}$$

$$\alpha_3 = \alpha_4 = 0 \quad (E43)$$

$$n_1:n_2:n_3:n_4 = L:\sqrt{W^2+L^2}:0:W \quad (E44)$$

When the vehicle is turned counter-clockwise, with the left rear wheel point P4 as center-of-turn, $$\alpha_1 = \tan^{-1}\left(-\frac{L}{W}\right) \quad (E45)$$

where $$-\frac{\pi}{2} < \alpha_1 < 0$$

$$\alpha_2 = -\frac{\pi}{2} \quad (E46)$$

$$\alpha_3 = \alpha_4 = 0 \quad (E47)$$

$$n_1:n_2:n_3:n_4 = \sqrt{W^2+L^2}:L:W:0 \quad (E48)$$

Figure 7:
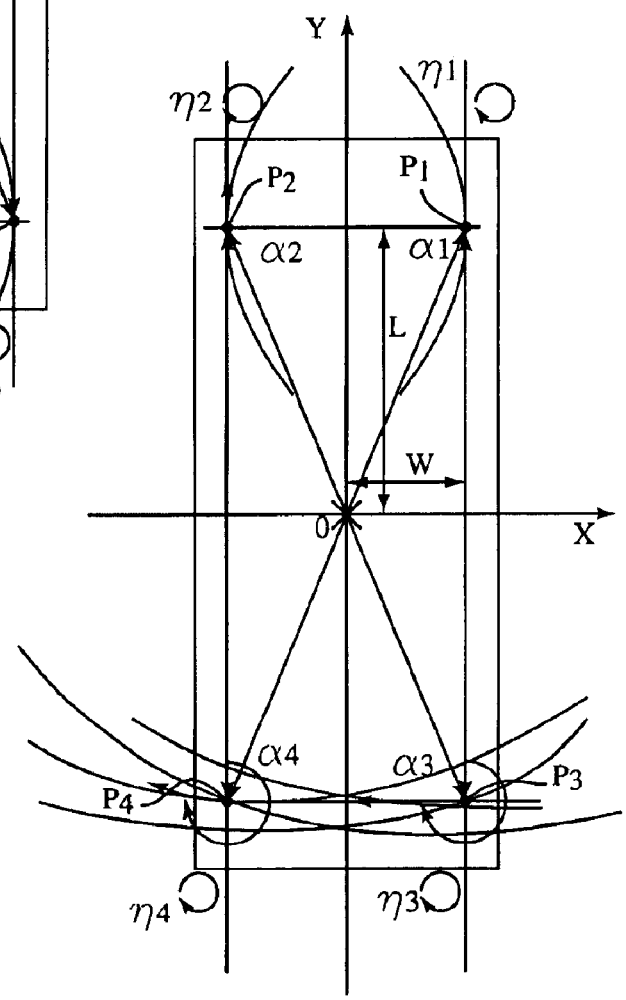
FIG. 7 is a drawing for explaining steering mode M5.

Steering mode M5, as shown in FIG. 7, is a mode in which the vehicle makes right, clockwise turns with the right front wheel, point P1, as center-of-turn, and makes left, counter-clockwise turns with the left front wheel, point P2, as center-of-turn. As is apparent from FIG. 7, to operate in steering mode M5, the steering angles α1, α2, α3, and α4 and rotation speeds n1, n2, n3, and n4 of the wheels must satisfy the condition equations (E51), (E52), (E53), (E54), (E55), (E56), (E57), and (E58).

When the vehicle is turned clockwise, with the right front wheel point P1 as center-of-turn, $$\alpha_1 = \alpha_2 = 0 \quad (E51)$$

$$\alpha_3 = -\frac{\pi}{2} \quad (E52)$$

$$\alpha_4 = \tan^{-1}\left(-\frac{L}{W}\right) \quad (E53)$$

where $$-\frac{\pi}{2} < \alpha_4 < 0$$

$$n_1:n_2:n_3:n_4 = 0:W:L:\sqrt{W^2+L^2} \quad (E54)$$

When the vehicle is turned counter-clockwise, with the left front wheel point P2 as center-of-turn, $$\alpha_1\alpha_2 = 0 \quad (E55)$$

$$\alpha_3 = \tan^{-1}\left(\frac{L}{W}\right) \quad (E56)$$

where $$0 < \alpha_3 < \frac{\pi}{2}$$

$$\alpha_4 = \frac{\pi}{2} \quad (E57)$$

$$n_1:n_2:n_3:n_4 = W:0:\sqrt{W^2+L^2}:L \quad (E58)$$

In the above description of the present embodiment, the condition equations for the steering angles α1, α2, α3, and α4 and rotation speeds n1, n2, n3, and n4 of the wheels 21–24 required to be satisfied in order to realize the steering modes M1, M3, M4, and M5, i.e., equations (E11), (E12), (E31), (E32), (E42), (E45), (E53) and (E56), were all expressed using $\tan^{-1}$. As noted above, since the trigonometric functions tan, sin, cos, cot, cosec, and sec are interrelated by a given relation, condition equations expressed using $\tan^{-1}$ can also be expressed using $\sin^{-1}$, $\cos^{-1}$, $\cot^{-1}$, $\csc^{-1}$, or $\sec^{-1}$.

In other words, the equations (E11) and (E12) for steering angles α1, α2, α3, and α4 required to realize steering mode M1 can also be expressed using $\sin^{-1}$, $\cos^{-1}$, $\cot^{-1}$, $\csc^{-1}$, or $\sec^{-1}$, as in the following equations.

For (R 0) right, clockwise turns $$\alpha_1 = -\alpha_3 = \tan^{-1}\left(\frac{L}{R-W}\right) = \sin^{-1}\left(\frac{L}{\sqrt{(R-W)^2+L^2}}\right)$$

$$= \cos^{-1}\left(\frac{R-W}{\sqrt{(R-W)^2+L^2}}\right) = \text{cosec}^{-1}\left(\frac{\sqrt{(R-W)^2+L^2}}{L}\right)$$

$$= \sec^{-1}\left(\frac{\sqrt{(R-W)^2+L^2}}{R-W}\right) = \cot^{-1}\left(\frac{R-W}{L}\right)$$

$$\alpha_2 = -\alpha_4 = \tan^{-1}\left(\frac{L}{R+W}\right) = \sin^{-1}\left(\frac{L}{\sqrt{(R+W)^2+L^2}}\right)$$

$$= \cos^{-1}\left(\frac{R+W}{\sqrt{(R+W)^2+L^2}}\right) = \text{cosec}^{-1}\left(\frac{\sqrt{(R+W)^2+L^2}}{L}\right)$$

$$= \sec^{-1}\left(\frac{\sqrt{(R+W)^2+L^2}}{R+W}\right) = \cot^{-1}\left(\frac{R+W}{L}\right)$$

where $$0 \le \alpha_1 \le \pi$$

$$0 \le \alpha_2 \le \frac{\pi}{2}$$

For (−R 0) left, counter-clockwise turns $$\alpha_1 = -\alpha_3 = \tan^{-1}\left(\frac{L}{R-W}\right) = \sin^{-1}\left(\frac{L}{\sqrt{(R-W)^2+L^2}}\right)$$

$$= \cos^{-1}\left(\frac{R-W}{\sqrt{(R-W)^2+L^2}}\right) = \text{cosec}^{-1}\left(\frac{\sqrt{(R-W)^2+L^2}}{L}\right)$$

$$= \sec^{-1}\left(\frac{\sqrt{(R-W)^2+L^2}}{R-W}\right) = \cot^{-1}\left(\frac{R-W}{L}\right)$$

$$\alpha_2 = -\alpha_4 = \tan^{-1}\left(\frac{L}{R+W}\right) = \sin^{-1}-\left(\frac{L}{\sqrt{(R+W)^2+L^2}}\right)$$

$$= \cos^{-1}\left(\frac{R+W}{\sqrt{(R+W)^2+L^2}}\right) = \text{cosec}^{-1}\left(\frac{\sqrt{(R+W)^2+L^2}}{L}\right)$$

$$= \sec^{-1}\left(\frac{\sqrt{(R+W)^2+L^2}}{R+W}\right) = \cot^{-1}\left(\frac{R+W}{L}\right)$$

where $$-\frac{\pi}{2} \le \alpha_1 \le 0$$

$$-\pi \le \alpha_2 \le 0.$$

Also, the condition equations (E31) and (E32) for the steering angles $\alpha_1$, $\alpha_2$, $\alpha_3$, and $\alpha_4$ required to realize steering mode M3, can also be expressed using $\sin^{-1}$, $\cos^{-1}$, $\cot^{-1}$, $\text{cosec}^{-1}$, and $\sec^{-1}$, as in the following equations.

$R > W(CW)$ clockwise, $$\alpha_1 = \tan^{-1}\left(\frac{2L}{R-W}\right) = \sin^{-1}\left(\frac{2L}{\sqrt{(R-W)^2+(2L)^2}}\right)$$

$$= \cos^{-1}\left(\frac{R-W}{\sqrt{(R-W)^2+(2L)^2}}\right) = \text{cosec}^{-1}\left(\frac{\sqrt{(R-W)^2+(2L)^2}}{2L}\right)$$

$$= \sec^{-1}\left(\frac{\sqrt{(R-W)^2+(2L)^2}}{R-W}\right) = \cot^{-1}\left(\frac{R-W}{2L}\right)$$

$$\alpha_2 = \tan^{-1}\left(\frac{2L}{R+W}\right) = \sin^{-1}\left(\frac{2L}{\sqrt{(R+W)^2+(2L)^2}}\right)$$

$$= \cos^{-1}\left(\frac{R+W}{\sqrt{(R+W)^2+(2L)^2}}\right) = \text{cosec}^{-1}\left(\frac{\sqrt{(R+W)^2+(2L)^2}}{2L}\right)$$

$$= \sec^{-1}\left(\frac{\sqrt{(R+W)^2+(2L)^2}}{R+W}\right) = \cot^{-1}\left(\frac{R+W}{2L}\right)$$

$\alpha_3 = \alpha_4 = 0$ where $$0 \le \alpha_1 \le \frac{\pi}{2}$$

$$0 \le \alpha_2 \le \frac{\pi}{2}.$$

and for the case −R<W counter-clockwise, $$\alpha_1 = \tan^{-1}\left(\frac{2L}{R-W}\right) = \sin^{-1}\left(\frac{2L}{\sqrt{(R-W)^2+(2L)^2}}\right)$$

$$= \cos^{-1}\left(\frac{R-W}{\sqrt{(R-W)^2+(2L)^2}}\right) = \text{cosec}^{-1}\left(\frac{\sqrt{(R-W)^2+(2L)^2}}{2L}\right)$$

$$= \sec^{-1}\left(\frac{\sqrt{(R-W)^2+(2L)^2}}{R-W}\right) = \cot^{-1}\left(\frac{R-W}{2L}\right)$$

$$\alpha_2 = \tan^{-1}\left(\frac{2L}{R+W}\right) = \sin^{-1}-\left(\frac{2L}{\sqrt{(R+W)^2+(2L)^2}}\right)$$

$$= \cos^{-1}\left(\frac{R+W}{\sqrt{(R+W)^2+(2L)^2}}\right) = \text{cosec}^{-1}\left(\frac{\sqrt{(R+W)^2+(2L)^2}}{2L}\right)$$

$$= \sec^{-1}\left(\frac{\sqrt{(R+W)^2+(2L)^2}}{R+W}\right) = \cot^{-1}\left(\frac{R+W}{2L}\right)$$

$\alpha_3 = \alpha_4 = 0$ where $$-\frac{\pi}{2} \le \alpha_1 \le 0$$

$$-\frac{\pi}{2} \le \alpha_2 \le 0.$$

Also, the condition equations (E42) and (E45) for the steering angles $\alpha_1$, $\alpha_2$, $\alpha_3$, and $\alpha_4$ required to realize steering mode M4, can also be expressed using $\sin^{-1}$, $\cos^{-1}$, $\cot^{-1}$, $\text{cosec}^{-1}$, and $\sec^{-1}$, as in the following equations.

When the center-of-turn is the right rear wheel, in a clockwise turn, $$\alpha_2 = \tan^{-1}\left(\frac{L}{W}\right) = \sin^{-1}\left(\frac{L}{\sqrt{W^2+L^2}}\right) = \cos^{-1}\left(\frac{W}{\sqrt{W^2+L^2}}\right)$$
$$= \csc^{-1}\left(\frac{\sqrt{W^2+L^2}}{L}\right) = \sec^{-1}\left(\frac{\sqrt{W^2+L^2}}{W}\right)$$
$$= \cot^{-1}\left(\frac{W}{L}\right)$$

$$\alpha_1 = \frac{\pi}{2}$$

$$\alpha_3 = \alpha_4 = 0$$

where, $$0 < \alpha_2 < \frac{\pi}{2}.$$

When the center-of-turn is the left rear wheel in a counter-clockwise turn $$\alpha_1 = \tan^{-1}\left(-\frac{L}{W}\right) = \sin^{-1}\left(-\frac{L}{\sqrt{W^2+L^2}}\right) = \cos^{-1}\left(-\frac{W}{\sqrt{W^2+L^2}}\right)$$
$$= \csc^{-1}\left(-\frac{\sqrt{W^2+L^2}}{L}\right) = \sec^{-1}\left(-\frac{\sqrt{W^2+L^2}}{W}\right)$$
$$= \cot^{-1}\left(-\frac{W}{L}\right)$$

$$\alpha_2 = -\frac{\pi}{2}$$

$$\alpha_3 = \alpha_4 = 0$$

where $$-\frac{\pi}{2} < \alpha_1 < 0.$$

Also, the condition equations (E53) and (E56) for the steering angles α1, α2, α3, and α4 required to realize steering mode M5, can also be expressed using $\sin^{-1}$, $\cos^{-1}$, $\cot^{-1}$, $\csc^{-1}$, or $\sec^{-1}$, as in the following equations.

When the center-of-turn is the right rear wheel, in a clockwise turn $$\alpha_4 = \tan^{-1}\left(-\frac{L}{W}\right) = \sin^{-1}\left(-\frac{L}{\sqrt{W^2+L^2}}\right) = \cos^{-1}\left(-\frac{W}{\sqrt{W^2+L^2}}\right)$$
$$= \csc^{-1}\left(-\frac{\sqrt{W^2+L^2}}{L}\right) = \sec^{-1}\left(-\frac{\sqrt{W^2+L^2}}{W}\right)$$
$$= \cot^{-1}\left(-\frac{W}{L}\right)$$

$$\alpha_3 = -\frac{\pi}{2}$$

$$\alpha_1 = \alpha_2 = 0$$

where $$-\frac{\pi}{2} < \alpha_4 < 0.$$

When the center-of-turn is the left rear wheel, in a counter-clockwise turn, $$\alpha_3 = \tan^{-1}\left(\frac{L}{W}\right) = \sin^{-1}\left(\frac{L}{\sqrt{W^2+L^2}}\right) = \cos^{-1}\left(\frac{W}{\sqrt{W^2+L^2}}\right)$$
$$= \csc^{-1}\left(\frac{\sqrt{W^2+L^2}}{L}\right) = \sec^{-1}\left(\frac{\sqrt{W^2+L^2}}{W}\right)$$
$$= \cot^{-1}\left(\frac{W}{L}\right)$$

$$\alpha_4 = -\frac{\pi}{2}$$

$$\alpha_1 = \alpha_2 = 0$$

where $$0 < \alpha_3 < \frac{\pi}{2}.$$

Since the paths traveled by the four wheels in the respective steering modes M1, M2, M3, M4, and M5 are not the same, each wheel must be driven according to the arc length of its own travel path. Also, the steering angles α1, α2, α3, and α4, and wheel rotation speeds n1, n2, n3, and n4 of the wheels 21–24, respectively, must be controlled according to the selected steering mode and vehicle speed and direction commands, such as to satisfy the conditions of the applicable condition equations (E11) through (E58). This applies not only while steering, but also during steering transitions, and after completion of steering operations. Failure to satisfy these conditions can cause skidding, wheel spinning, or toe-in, or toe-out between left and right wheels.

In other words, the driver considers the passageway constraints of the facilities in which the vehicle is to be driven, and selects the most appropriate one of the steering modes M1, M2, M3, M4, and M5 for the conditions. After switching to the desired mode, the driver performs vehicle operation actions that generate vehicle speed and direction commands for controlling the rotation of the drive motors 21*a*, 22*a*, 23*a* and 24*a*, which drive the vehicle wheels 21–24, respectively, and the steering motors 21*b*, 22*b*, 23*b*, and 24*b*, which steer the vehicle wheels 21–24, respectively, based on the condition equations (E11) through (E58). This enables the vehicle to operate easily within the passageway constraints of the facility, to move about the facility quickly and accurately, making turns, coming about in either direction, moving sideways, etc., even in confined areas with little floor space.

In order to achieve proper operation of each of the vehicle's wheels in the steering modes M1, M2, M3, M4, and M5, such as to maintain the relationships of the condition equations (E11) through (E58) for the steering modes M1, M2, M3, M4, and M5 as described above, the rotation of the drive motors 21*a*, 22*a*, 23*a*, and 24*a* and the steering motors 21*b*, 22*b*, 23*b*, and 24*b* must be precisely controlled. This requires an electric vehicle steering/drive control system.

Figure 8:
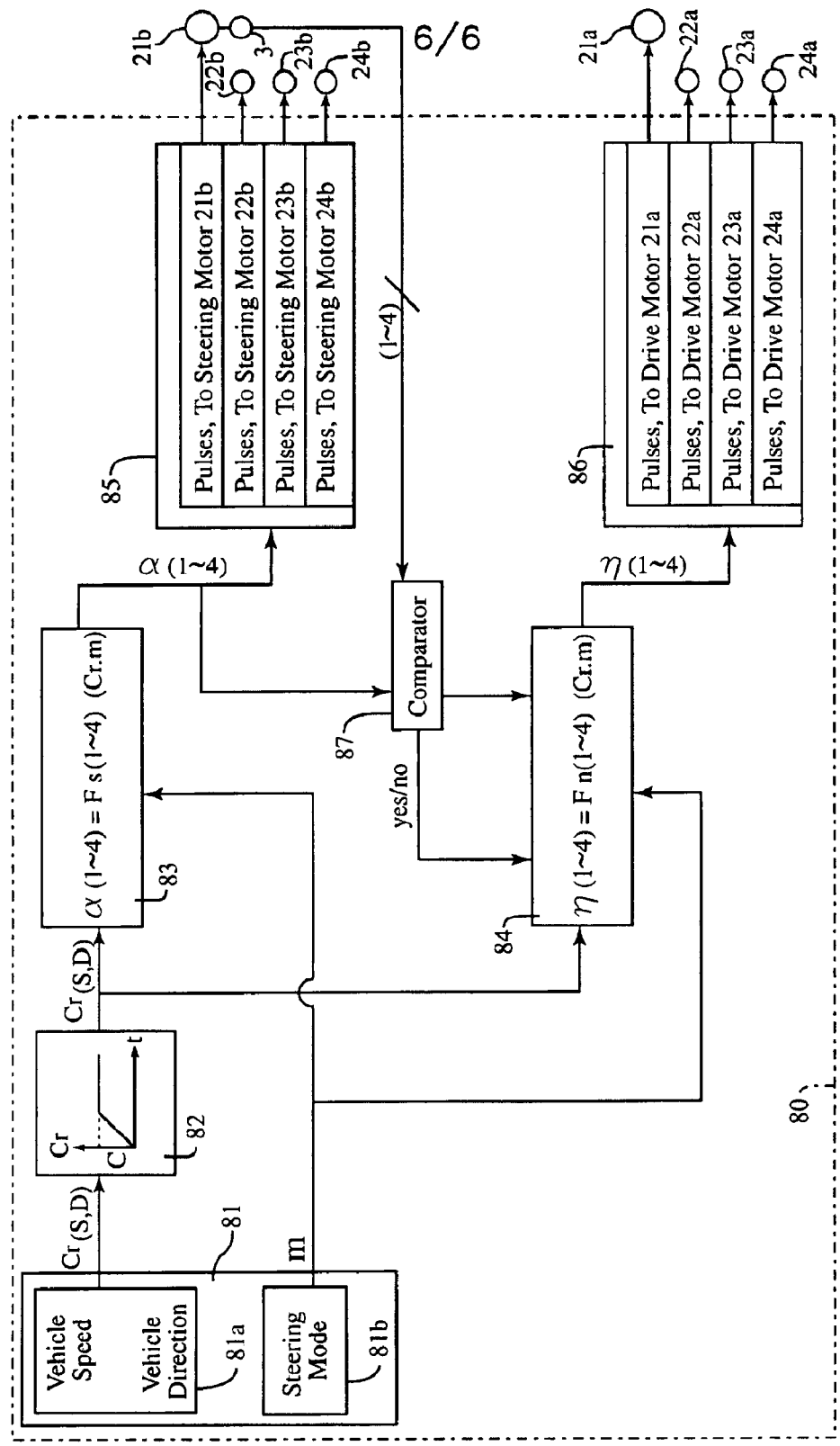
FIG. 8 is a block diagram of an electric vehicle steering/drive control system in one embodiment of the present invention.

Shown in FIG. 8 is a block diagram of an electric vehicle steering/drive control system of one embodiment of the present invention. As shown in FIG. 8, the electric vehicle steering/drive control system 80 comprises a steering/drive command means 81 that is operated by the vehicle driver; a command signal rate-of-change suppression means 82, a wheel steering angle computation means (computer) 83; a wheel rotation speed computation means (computer) 84; a steering motor control means 85; a drive motor control means 86; and a steering angle comparator means 87. The steering/drive command means 81 is in turn made up of a vehicle speed and direction command means 81a, and a steering mode selection means 81b.

The vehicle speed and direction command means 81a is a device for generating vehicle speed (S) and direction (D) commands in response to operations performed by the driver, i.e., it generates a vehicle speed/direction command signal $C_{(S,D)}$ based on operations performed by the driver. The steering mode selection means 81b is a means whereby the driver selects one of a plurality of different steering modes (M1, M2, M3, M4, and M5) provided in advance as steering mode candidates, based on his consideration of the facility vehicle passageway constraints. The steering mode selection means 81b outputs a steering mode select signal (m) that corresponds to the selected steering mode. It is important to note, with respect to the steering mode selection means 81b, that mode select switching between the modes M1, M2, M3, M4, or M5 by the driver is possible only when the vehicle is stopped, i.e., only when the drive motors 21a, 22a, 23a, 24a and the steering motors 21b, 22b, 23b, and 24b are stopped. This is done to avoid application of mechanical shock to the vehicle, which could result if switching between steering mode groups having wheel travel path patterns with high fundamental discontinuities were to occur while the vehicle is in motion. It should also be noted that the number of candidate steering modes, e.g., steering modes M1–M5, is not limited to five.

The command signal rate-of-change suppression means 82 smoothes out any abrupt changes occurring in the vehicle speed and direction command signal $C_{(S, D)}$, for example, abrupt changes in the rising edge of that signal, thus generating an adjusted vehicle speed/direction command signal $Cr_{(S, D)}$. That is, the command signal rate-of-change suppression means 82 holds the value of the driver-commanded rate of change of vehicle direction D, its change per unit time, dD/dt, and the driver-command rate of change of vehicle speed S, its change per unit time, dS/dt, to a value smaller than both a "steering angle following performance" responsiveness to wheel steering angle change commands value dα/dt, and a "wheel rotation speed following performance" responsiveness to wheel rotation speed change commands value dn/dt, of each of the wheels 21–24 in order to convert the vehicle speed/direction command signal $C_{(S, D)}$ to the adjusted vehicle speed/direction command signal $Cr_{(S, D)}$. The reason for inserting this command signal rate-of-change suppression means 82 in the command signal flow path is that if the rate-of-change of vehicle direction D, its change per unit time, dD/dt or rate of change of vehicle speed S, its change per unit time, dS/dt is larger, changes faster, than either the steering angle following performance dα/dt, or rotation speed following performance dn/dt of the wheels, the actual steering angles α1, α2, α3, and α4, and wheel rotation speeds n1, n2, n3, and n4 of the wheels 21–24 would not be able to respond quickly to control commands, thus the steering/drive control of the vehicle would be disrupted and become unstable. In systems in which this is not a concern, the command signal rate-of-change suppression means 82 need not be provided.

Stored in the wheel steering angle computation means 83 are:

a program for computing the wheel steering angles α1, α2, α3 and α4 based on the condition equation (E11) required for steering according to steering mode 1;

a program for computing the wheel steering angles α1, α2, α3 and α4 based on the condition equation (E21) required for steering according to steering mode 2;

a program for computing the wheel steering angles α1, α2, α3 and α4 based on the condition equations (E31), (E32) and (E33) required for steering according to steering mode 3;

a program for computing the wheel steering angles α1, α2, α3 and α4 based on the condition equations (E41), (E42), (E43), (E45), (E46) and (E47) required for steering according to steering mode 4; and a program for computing the wheel steering angles α1, α2, α3 and α4 based on the condition equations (E51), (E52), (E53), (E55), (E56) and (E57) required for steering according to steering mode 5.

The wheel steering angle computation means 83 receives the "steering mode select signal m" and the "adjusted vehicle speed/direction command signal $Cr_{(S, D)}$," and using the appropriate one of the above programs, computes steering angles α1, α2, α3 and α4 that satisfy the condition equation(s) for the selected steering mode of steering modes M1 through M5.

Stored in the wheel rotation speed computation means 84 are:

a program for computing the wheel rotation speeds n1, n2, n3 and n4 based on the condition equation (E13), required for steering according to steering mode 1;

a program for computing the wheel rotation speeds n1, n2, n3 and n4 based on the condition equation (E22) required for steering according to steering mode 2;

a program for computing the wheel rotation speeds n1, n2, n3 and n4 based on the condition equation (E34) required for steering according to steering mode 3;

a program for computing the wheel rotation speeds n1, n2, n3 and n4 based on the condition equations (E44) and (E48) required for steering according to steering mode 4; and a program for computing the wheel rotation speeds n1, n2, n3 and n4 based on the condition equations (E54) and (E58) required for steering according to steering mode 5.

The wheel rotation speed computation means 84 receives the "steering mode select signal m" and the "adjusted vehicle speed/direction command signal $Cr_{(S, D)}$," and uses the appropriate one of the above programs to compute wheel rotation speeds n1, n2, n3 and n4 that satisfy the condition equation(s) for the selected mode of steering modes M1 through M5.

The steering motor control means 85 is a pulse generator configured such that the number of pulses generated corresponds to the respective steering angles α1, α2, α3, and α4 based on the values for those angles computed by the wheel steering angle computation means 83. The pulses are applied to the steering motors 21b, 22b, 23b, and 24b, respectively, to control the rotation thereof as required to steer the respective wheels—24 to their respective prescribed steering angles α1, α2, α3, and α4.

Based on the wheel rotation speeds n1, n2, n3, and n4 as computed for the respective wheels by the wheel rotation speed computation means 84, the drive motor control means 86 outputs electrical power supply frequencies corresponding to the wheel rotation speeds n1, n2, n3, and n4, and applies them to the drive motors 21a, 22a, 23a, and 24a, respectively, thus controlling the rotation of the drive motors 21a, 22a, 23a, and 24a such that the wheels 21–24 will rotate at their prescribed rotation speeds of n1, n2, n3, and n4, respectively.

The motors used for the steering motors 21b, 22b, 23b, and 24b are pulse-controlled motors in which the angle of rotation can be precisely controlled by the number of pulses applied to them. The motors used for the drive motors 21a, 22a, 23a, and 24a, on the other hand, are frequency-controlled induction motors with a rated slip of at least 1%. This amount of slip will enable variances in effective wheel diameter to be absorbed to within an acceptable level. In the embodiments described above, the use of frequency-controlled induction drive motors with a rated slip of 5% provided conspicuous effect with respect to absorbing such variances. In addition, a steering angle sensor 3 is provided for each of the steering motors 21b, 22b, 23b, and 24b, for sensing the actual steering angles of the wheels while the vehicle is being driven.

The steering angle comparator means 87 compares the steering angles $\alpha1$, $\alpha2$, $\alpha3$, and $\alpha4$ computed by the wheel steering angle computation means 83 with the actual steering angles of the wheels as sensed by the steering angle sensors 3, and feeds-back the difference between these two steering angles to the control system to make control corrections in the rotation of the drive motors 21a–24a and/or the steering motors 21b–24b to correct the actual steering angles of the wheels 21–24. Also, although in the present embodiment as described above, the difference between the two steering angles compared by the steering angle comparator means 87 is reflected in the wheel rotation speed computation means 84, this difference angle could also be fed-back to the wheel steering angle computation means 83.

In one embodiment of the present invention, an electric vehicle with a steering/drive control method and steering/drive control system is configured such that any one of a plurality of different steering modes can be switch-selected through the electric vehicle's steering/drive control system. Of this plurality of different steering modes, the five modes designated M1, M2, M3, M4, and M5 were thought to be especially useful, and as such, were described above. One could, however, encounter facilities in which (1) the passageway constraints are fairly uniform throughout the entire facility; (2) the passageway constraints impose conditions that cannot be satisfied by the steering mode the wheel travel paths of a conventional four-wheel-drive electric car; and (3) these conditions can, however, be satisfied by one of the steering modes M1, M2, M3, M4, and M5, not available in any conventional four-wheel-drive electric car. In this situation, one could use a single-steering-mode electric vehicle having installed therein, a specialized steering/drive control system having one particular steering mode of the steering modes M1, M2, M3, M4, and M5 that satisfies the conditions imposed by the passageway constraints of that facility. In other words, this problem could be solved by a single-steering-mode electric vehicle having installed therein a steering/drive control system for controlling the rotation of each of its steering motors and drive motors to control the steering angle and speed of rotation of each wheel in accordance with the condition equation(s) required to control steering and drive according to that particular steering mode, as discussed above. Such a configuration would not require a mode selection means for switching modes and the wheel steering angle computation means and wheel rotation speed computation means would only be making computations according to the condition equation(s) required for the one particular steering mode. This would serve to reduce the cost of the steering/drive control system and the electric vehicle, and would also simplify operation of the vehicle.

As is clear from the above example, according to the present invention, it is possible to effect steering and drive control wherein the wheels may inscribe a number of different travel path patterns, or steering and drive control wherein the wheels may inscribe a single travel path pattern, suitable for operation within the passageway constraints of an individual facility, for causing a vehicle to quickly and accurately turn, change its direction, or move sideways, as required to quickly and smoothly guide the vehicle into a desired location and orientation.

Also, instead of using a mechanical apparatus, which would provide only limited flexibility in terms of the selection and/or switching of steering mode(s), the means used for controlling steering in the present invention is one in which the steering mode is selected entirely by electrical means. This makes it possible to provide a wide variety of control capabilities, and also simplify the configuration of the steering control apparatus.

Also, through the present invention, it is possible to perform theoretically exact control of the steering angles and rotation speeds of the wheels in the various steering modes. This makes it possible to avoid skids and wheel-spinning when making turns, and to prevent "toe-in" and "toe-out" when running straight.

Also, according to the present invention, if there are abrupt changes in a vehicle speed and direction command signal that is based on operations performed by the driver, those abrupt changes will be smoothed-out by a "command signal rate-of-change suppression means," thus to maintain stable steering/drive control without disturbing the control system.

Also, according to the present invention, the actual steering angles of the wheels are sensed and fed-back to the control system to provide corrected control of steering angle. Also, frequency-controlled induction motors are used for the drive motors, which makes it possible to absorb or correct for imbalance in the drive power applied to the wheels resulting from changes in the effective diameters of the wheels due to tire wear, changes in tire inflation pressure, or changes in the loads applied to the wheels.

The foregoing describes the preferred embodiment of the invention. A variety of modifications could be made, however, without deviating from the scope of the invention as defined by the following claims:

What is claimed is:

1. A method of operating an electric vehicle having a left front, a right front, a left rear and a right rear wheel, and a plurality of drive motors, comprising the steps of:

preparing a plurality of different steering modes, comprising an M1 steering mode wherein the travel paths of the right and left rear wheels follow the travel paths of the right and left front wheels, respectively;

an M2 steering mode wherein the travel paths of the front and rear wheels lie parallel to each other;

an M3 steering mode wherein the rear wheel turning path relative to the wheel turning path is an inside wheel difference path;

an M4 steering mode wherein the vehicle turns to the right with the right rear wheel as the center of rotation of the turn, and turns to the left with the left rear wheel as the center of rotation of the turn; and, an M5 steering mode wherein the vehicle turns to the right with the right front wheel as the center of rotation of the turn, and turns to the left with the left front wheel as the center of rotation of the turn;

selecting one of the steering modes based on a particular driving condition, and giving a vehicle speed/direction command; and, controlling the steering angle and rotation of speed of each wheel separately, in accordance with a condition equation for performing steering/drive operations according to the selected steering mode and vehicle speed/direction command, thereby effecting steering/drive control separately for each wheel, wherein the condition equations required to perform steering/drive operations according to the steering mode M1 can be expressed as the condition equations $$\alpha_1 = -\alpha_3 = \tan^{-1}\left(\frac{L}{R-W}\right)$$

$$\alpha_2 = -\alpha_4 = \tan^{-1}\left(\frac{L}{R+W}\right)$$

$$n_1:n_2:n_3:n_4 = \sqrt{(R-W)^2+L^2}:\sqrt{(R+W)^2+L^2}:\sqrt{(R-W)^2+L^2}:\sqrt{(R+W)^2+L^2}$$

where $\alpha 1$, $\alpha 2$, $\alpha 3$, and $\alpha 4$ are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between the front wheels and rear wheels;

W is the distance between each wheel and a center line Y between the right wheels and the left wheels; and, R, for the case in which the turning paths of the wheels inscribe concentric arcs, is the distance between the center of the concentric arcs and a point central to the locations of the four wheels.

2. A method of operating an electric vehicle having a left front, a right front, a left rear and a right rear wheel, and a plurality of drive motors, comprising the steps of:

preparing a plurality of different steering modes comprising at least one of
an M1 steering mode wherein the travel paths of the right and left rear wheels follow the travel paths the right and left front wheels, respectively;
an M2 steering mode wherein the travel paths of the front and rear wheels are lie parallel to each other;
an M3 steering mode wherein the rear wheel turning path relative to the front wheel turning path is an inside wheel difference path;
an M4 steering mode wherein the vehicle turns to the right with the right rear wheel as the center of rotation of the turn, and turns to the left with the left rear wheel as the center of rotation of the turn; and,
an M5 steering mode wherein the vehicle turns to the right with the right front wheel as the center of rotation of the turn, and turns to the left with the left front wheel as the center of rotation of the turn;

selecting a steering mode through an operation performed by a vehicle driver and giving a vehicle speed/direction command by a vehicle driver based on a particular driving condition;

holding the rate of change of a vehicle speed/direction command signal resulting from operations performed by the driver to a value smaller than the lowest value of either of the steering angle command following performance or the speed of rotation command following performance of the wheels, thereby adjusting the vehicle speed/direction command signal; and, controlling the steering angle and rotation of speed of each wheel separately, in accordance with a condition equation for performing steering/drive operations according to the selected steering mode and vehicle speed/direction command, thereby effecting steering/drive control separately for each wheel, wherein the condition equations required to perform steering/drive operations according to the steering mode M1 can be expressed as the condition equations $$\alpha_1 = -\alpha_3 = \tan^{-1}\left(\frac{L}{R-W}\right)$$

$$\alpha_2 = -\alpha_4 = \tan^{-1}\left(\frac{L}{R+W}\right)$$

$$n_1:n_2:n_3:n_4 = \sqrt{(R-W)^2+L^2}:\sqrt{(R+W)^2+L^2}:\sqrt{(R-W)^2+L^2}:\sqrt{(R+W)^2+L^2}$$

where $\alpha 1$, $\alpha 2$, $\alpha 3$, and $\alpha 4$ are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between th front wheels and rear wheels;

W is the distance between each wheel and a center line Y between the right wheels and the left wheels; and, R, for the case wherein the turning paths of the wheels inscribe concentric arcs, is the distance between the center of the concentric arcs and a point central to the locations of the four wheels.

3. A method of operating and electric vehicle having left front, a right front, a left rear and a right rear wheel, and a plurality of drive motors, comprising the steps of:

preparing a plurality of different steering modes, comprising
an M1 steering mode wherein the travel paths of the right and left rear wheels follow the travel paths of the right and left front wheels, respectively;
an M2 steering mode wherein the travel paths of the front and rear wheels lie parallel to each other;
an M3 steering mode wherein the rear wheel turning path relative to the front wheel turning path is an inside wheel difference path;
an M4 steering mode wherein the vehicle turns to the right with the right rear wheel as the center of rotation of the turn, and turns to the left with the left rear wheel as the center of rotation of the turn; and,
an M5 steering mode wherein the vehicle turns to the right with the right front wheel as the center of rotation of the turn, and turns to the left with the left front wheel as the center of rotation of the turn;

selecting one of the steering modes based on a particular driving condition, and giving a vehicle speed/direction command; and, controlling the steering angle and rotation of speed of each wheel separately, in accordance with a condition equation for performing steering/drive operations according to the selected steering mode and vehicle speed/direction command, thereby effecting steering/drive control separately for each wheel, wherein the condition equations required to perform steering/drive operations according to the steering mode M2 are equations that can be expressed as the condition equations $\alpha_1=\alpha_2=\alpha_3=\alpha_4$ $n_1=n_2=n_3=n_4$ where α1, α2, α3, and α4 are the steering angles for the right front, left front, right rear, and left rear wheels, respectively; and, n1, n2, n3, and n4 are the wheel rotation speeds for the right front, left front, right rear, and left rear wheels, respectively.

4. A method of operating an electric vehicle having a left front, a right front, a left rear and a right rear wheel, and a plurality of drive motors, comprising the steps of:

preparing a plurality of different steering modes comprising at least one of
an M1 steering mode wherein the travel paths of the right and left rear wheels follow the travel paths the right and left front wheels, respectively;
an M2 steering mode wherein the travel paths of the front and rear wheels are lie parallel to each other;
an M3 steering mode wherein the rear wheel turning path relative to the front wheel turning path is an inside wheel difference path;
an M4 steering mode wherein the vehicle turns to the right with the right rear wheel as the center of rotation of the turn, and turns to the left with the left rear wheel as the center of rotation of the turn; and,
an M5 steering mode wherein the vehicle turns to the right with the right front wheel as the center of rotation of the turn, and turns to the left with the left front wheel as the center of rotation of the turn;

selecting a steering mode through an operation performed by a vehicle driver and giving a vehicle speed/direction command by a vehicle driver based on a particular driving condition;

holding the rate of change of a vehicle speed/direction command signal resulting from operations performed by the driver to a value smaller than the lowest value of either of the steering angle command following performance or the speed of rotation command following performance of the wheels, thereby adjusting the vehicle speed/direction command signal; and, controlling the steering angle and rotation of speed of each wheel separately, in accordance with a condition equation for performing steering/drive operations according to the selected steering mode and vehicle speed/direction command, thereby effecting steering/drive control separately for each wheel, wherein the condition equations required to perform steering/drive operations according to the steering mode M2 can be expressed as the condition equations $\alpha_1=\alpha_2=\alpha_3=\alpha_4$ $n_1=n_2=n_3=n_4$ where α1, α2, α3, and α4 are the steering angles for the right front, left front, right rear, and left rear wheels, respectively; and, n1, n2, n3, and n4 are the wheel rotation speeds for the right front, left front, right rear, and left rear wheels, respectively.

5. A method of operating an electric vehicle having a left front, a right front, a left rear and a right rear wheel, and a plurality of drive motors, comprising the steps of:

preparing a plurality of different steering modes, comprising
an M1 steering mode wherein the travel paths of the right and left rear wheels follow the travel paths of the right and left front wheels, respectively;
an M2 steering mode wherein the travel paths of the front and rear wheels lie parallel to each other;
an M3 steering mode wherein the rear wheel turning path relative to the front wheel turning path is an inside wheel difference path;
an M4 steering mode wherein the vehicle turns to the right with the right rear wheel as the center of rotation of the turn, and turns to the left with the left rear wheel as the center of rotation of the turn; and,
an M5 steering mode wherein the vehicle turns to the right with the right front wheel as the center of rotation of the turn, and turns to the left with the left front wheel as the center of rotation of the turn;

selecting one of the steering modes based on a particular driving condition, and giving a vehicle speed/direction command; and, controlling the steering angle and rotation of speed of each wheel separately, in accordance with a condition equation for performing steering/drive operations according to the selected steering mode and vehicle speed/direction command, thereby effecting steering/drive control separately for each wheel, wherein the condition equations required to perform steering/drive operations according to the steering mode M3 can be expressed as the condition equations $$\alpha_1 = \tan^{-1}\left(\frac{2L}{R-W}\right)$$

$$\alpha_2 = \tan^{-1}\left(\frac{2L}{R+W}\right)$$

$\alpha_3=\alpha_4=0$ $n_1:n_2:n_3:n_4=\sqrt{(R-W)^2+(2L)^2}:\sqrt{(R+W)^2+(2L)^2}:|R-W|:|R+W|.$ where α1, α2, α3, and α4 are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between the front wheels and rear wheels;

W is the distance between each wheel and a center line Y between the right wheels and the left wheels; and, R, for the case wherein the turning paths of the wheels inscribe concentric arcs, is the distance between the center of the concentric arcs and a point central to the locations of the four wheels.

6. A method of operating an electric vehicle having a left front, a right front, a left rear and a right rear wheel, and a plurality of drive motors, comprising the steps of:

preparing a plurality of different steering modes comprising at least one of an M1 steering mode wherein the travel paths of the right and left rear wheels follow the travel paths the right and left front wheels, respectively;

an M2 steering mode wherein the travel paths of the front and rear wheels are lie parallel to each other;

an M3 steering mode wherein the rear wheel turning path relative to the front wheel turning path is an inside wheel difference path;

an M4 steering mode wherein the vehicle turns to the right with the right rear wheel as the center of rotation of the turn, and turns to left with the left rear wheel as the center of rotation of the turn; and, an M5 steering mode wherein the vehicle turns to the right with the right front wheel as the center of rotation of the turn, and turns to the left with the left front wheel as the center of rotation of the turn;

selecting a steering mode through an operation performed by a vehicle driver and giving a vehicle speed/direction command by a vehicle driver based on a particular driving condition;

holding the rate of change of a vehicle speed/direction command signal resulting from operations performed by the driver to a value smaller than the lowest value of either of the steering angle command following performance or the speed of rotation command following performance of the wheels, thereby adjusting the vehicle speed/direction command signal; and, controlling the steering angle and rotation of speed of each wheel separately, in accordance with a condition equation for performing steering/drive operations according to the selected steering mode and vehicle speed/direction command, thereby effecting steering/drive control separately for each wheel, wherein the condition equations required to perform steering/drive operations according to the steering mode M3 can be expressed as the condition equations $$\alpha_1 = \tan^{-1}\left(\frac{2L}{R-W}\right)$$

$$\alpha_2 = \tan^{-1}\left(\frac{2L}{R+W}\right)$$

$$\alpha_3 = \alpha_4 = 0$$

$$n_1:n_2:n_3:n_4 = \sqrt{(R-W)^2+(2L)^2}:\sqrt{(R+W)^2+(2L)^2}:|R-W|:|R+W|.$$

where

α1, α2, α3, and α4 are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between the front wheels and rear wheels;

W is the distance between each wheel and a center line Y between the right wheels and the left wheels; and, R, for the case wherein the turning paths of the wheels inscribe concentric arcs, is the distance between the center of the concentric arcs and a point central to the locations of the four wheels.

7. A method of operating an electric vehicle having a left front, a right front, a left rear and a right rear wheel, and a plurality of drive motors, comprising the steps of:

preparing a plurality of different steering modes, comprising an M1 steering mode wherein the travel paths of the right and left rear wheels follow the travel paths of the right and left front wheels, respectively;

an M2 steering mode wherein the travel paths of the front and rear wheels lie parallel to each other;

an M3 steering mode wherein the rear wheel turning path relative to the front wheel turning path is an inside wheel difference path;

an M4 steering mode wherein the vehicle turns to the right with the right rear wheel as the center of rotation of the turn, and turns to left with the left rear wheel as the center of rotation of the turn; and, an M5 steering mode wherein the vehicle turns to the right with the right front wheel as the center of rotation of the turn, and turns to the left with the left front wheel as the center of rotation of the turn;

selecting one of the steering modes based on a particular driving condition, and giving a vehicle speed/direction command; and, controlling the steering angle and rotation of speed of each wheel separately, in accordance with a condition equation for performing steering/drive operations according to the selected steering mode and vehicle speed/direction command, thereby effecting steering/drive control separately for each wheel, wherein the condition equations required to perform steering/drive operations according to the steering mode M4 can be expressed as $$\alpha_1 = \frac{\pi}{2}$$

$$\alpha_2 = \tan^{-1}\left(\frac{L}{W}\right)$$

$$\alpha_3 = \alpha_4 = 0$$

$$n_1:n_2:n_3:n_4 = L:\sqrt{W^2+L^2}:0:W$$

for right turns, and as $$\alpha_1 = \tan^{-1}\left(-\frac{L}{W}\right)$$

$$\alpha_2 = -\frac{\pi}{2}$$

$$\alpha_3 = \alpha_4 = 0$$

$$n_1:n_2:n_3:n_4 = \sqrt{W^2+L^2}:L:W:0$$

for left turns, where

α1, α2, α3, and α4 are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between the front wheels and rear wheels; and, W is the distance between each wheel and a center line Y between the right wheels and the left wheels.

8. A method of operating an electric vehicle having a left front, a right front, a left rear and a right rear wheel, and a plurality of drive motors, comprising the steps of:

preparing a plurality of different steering modes comprising at least one of
- an M1 steering mode wherein the travel paths of the right and left rear wheels follow the travel paths the right and left front wheels, respectively;
- an M2 steering mode wherein the travel paths of the front and rear wheels are lie parallel to each other;
- an M3 steering mode wherein the rear wheel turning path relative to the front wheel turning path is an inside wheel difference path;
- an M4 steering mode wherein the vehicle turns to the right with the right rear wheel as the center of rotation of the turn, and turns to the left with the left rear wheel as the center of rotation of the turn; and,
- an M5 steering mode wherein the vehicle to the right with the right front wheel as the center of rotation of the turn, and turns to the left with the left front wheel as the center of rotation of the turn;

selecting a steering mode through an operation performed by a vehicle driver and giving a vehicle speed/direction command by a vehicle driver based on a particular driving condition;

holding the rate of change of a vehicle speed/direction command signal resulting from operations performed by the driver to a value smaller than the lowest value of either of the steering angle command following performance or the speed of rotation command following performance of the wheels, thereby adjusting the vehicle speed/direction command signal; and, controlling the steering angle and rotation of speed of each wheel separately, in accordance with a condition equation for performing steering/drive operations according to the selected steering mode and vehicle speed/direction command, thereby effecting steering/drive control separately for each wheel, wherein the condition equations required to perform steering/drive operations according to the steering mode M4 can be expressed as $$\alpha_1 = \frac{\pi}{2}$$

$$\alpha_2 = \tan^{-1}\left(\frac{L}{W}\right)$$

$$\alpha_3 = \alpha_4 = 0$$

$$n_1:n_2:n_3:n_4 = L:\sqrt{W^2+L^2}:0:W$$

for right turns, and $$\alpha_1 = \tan^{-1}\left(-\frac{L}{W}\right)$$

$$\alpha_2 = -\frac{\pi}{2}$$

$$\alpha_3 = \alpha_4 = 0$$

$$n_1:n_2:n_3:n_4 = \sqrt{W^2+L^2}:L:W:0$$

for left turns, where $\alpha_1, \alpha_2, \alpha_3$, and $\alpha_4$ are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between th front wheels and rear wheels; and, W is the distance between each wheel and a center line Y between the right wheels and the left wheels.

9. A method of operating an electric vehicle having left front, a right front, a left rear and a right rear wheel, and a plurality of drive motors, comprising the steps of:

preparing a plurality of different steering modes, comprising
- an M1 steering mode wherein the travel paths of the right and left rear wheels follow the travel paths of the right and left front wheels, respectively;
- an M2 steering mode wherein the travel paths of the front and rear wheels lie parallel to each other;
- an M3 steering mode wherein the rear wheel turning path relative to the front wheel turning path is an inside wheel difference path;
- an M4 steering mode wherein the vehicle turns to the right with the right rear wheel as the center of rotation of the turn, and turns to left with the left rear wheel as the center of rotation of the turn; and,
- an M5 steering mode wherein the vehicle turns to the right with the right front wheel as the center of rotation of the turn, and turns to the left with the left front wheel as the center of rotation of the turn;

selecting one of the steering modes based on a particular driving condition, and giving a vehicle speed/direction command; and, controlling the steering angle and rotation of speed of each wheel separately, in accordance with a condition equation for performing steering/drive operations according to the selected steering mode and vehicle speed/direction command, thereby effecting steering/drive control separately for each wheel, wherein the condition equations required to perform steering/drive operations according to the M5 steering mode can be expressed as $$\alpha_1 = \alpha_2 = 0$$

$$\alpha_3 = -\frac{\pi}{2}$$

$$\alpha_4 = \tan^{-1}\left(-\frac{L}{W}\right)$$

$$n_1:n_2:n_3:n_4 = 0:W:L:\sqrt{W^2+L^2}$$

for right turns, and $$\alpha_1 = \alpha_2 = 0$$

$$\alpha_3 = \tan^{-1}\left(\frac{L}{W}\right)$$

$$\alpha_4 = \frac{\pi}{2}$$

$$n_1:n_2:n_3:n_4 = W:0:\sqrt{W^2+L^2}:L$$

for left turns, where

α1, α2, α3, and α4 are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between the front wheels and rear wheels; and, W is the distance between each wheel and a center line Y between the right wheels and the left wheels.

10. A method of operating an electric vehicle having a left front, a right front, a left rear and a right rear wheel, and a plurality of drive motors, comprising the steps of:

preparing a plurality of different steering modes comprising at least one of an M1 steering mode wherein the travel paths of the right and left rear wheels follow the travel paths the right and left front wheels, respectively;

an M2 steering mode wherein the travel paths of the front and rear wheels are lie parallel to each other;

an M3 steering mode wherein the rear wheel turning path relative to the front wheel turning path is an inside wheel difference path;

an M4 steering mode wherein the vehicle turns to the right with the right rear wheel as the center of rotation of the turn, and turns to the left with the left rear wheel as the center of rotation of the turn; and, an M5 steering mode wherein the vehicle turns to the right with the right front wheel as the center of rotation of the turn, and turns to the left with the left front wheel as the center of rotation of the turn;

selecting a steering mode through an operation performed by a vehicle driver and giving a vehicle speed/direction command by a vehicle driver based on a particular driving condition;

holding the rate of change of a vehicle speed/direction command signal resulting from operations performed by the driver to a value smaller than the lowest value of either of the steering angle command following performance or the speed of rotation command following performance of the wheels, thereby adjusting the vehicle speed/direction command signal; and, controlling the steering angle and rotation of speed of each wheel separately, in accordance with a condition equation for performing steering/drive operations according to the selected steering mode and vehicle speed/direction command, thereby effecting steering/drive control separately for each wheel, wherein the condition equations required to perform steering/drive operations according to the M5 steering mode can be expressed as $$\alpha_1 = \alpha_2 = 0$$

$$\alpha_3 = -\frac{\pi}{2}$$

$$\alpha_4 = \tan^{-1}\left(-\frac{L}{W}\right)$$

$$n_1:n_2:n_3:n_4 = 0:W:L:\sqrt{W^2+L^2}$$

for right turns, and $$\alpha_1 = \alpha_2 = 0$$

$$\alpha_3 = \tan^{-1}\left(\frac{L}{W}\right)$$

$$\alpha_4 = \frac{\pi}{2}$$

$$n_1:n_2:n_3:n_4 = W:0:\sqrt{W^2+L^2}:L$$

for left turns, where

α1, α2, α3, and α4 are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between the front wheels and rear wheels; and, W is the distance between each wheel and a center line Y between the right wheels and the left wheels.

11. A method of operating and electric vehicle having a left front, a right front, a left rear and a right rear wheel, and a plurality of steering and drive motors, comprising the steps of:

controlling the rotation of each of the steering motors and drive motors in accordance with condition equations that can be expressed as $$\alpha_1 = -\alpha_3 = \tan^{-1}\left(\frac{L}{R-W}\right)$$

$$\alpha_2 = -\alpha_4 = \tan^{-1}\left(\frac{L}{R+W}\right)$$

$$n_1:n_2:n_3:n_4 = \sqrt{(R-W)^2+L^2}:\sqrt{(R+W)^2+L^2}:\sqrt{(R-W)^2+L^2}:\sqrt{(R+W)^2+L^2}$$

where

α1, α2, α3, and α4 are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between the front wheels and rear wheels;

W is the distance between each wheel and a center line Y between the right wheels and the left wheels; and, R, for the case in which the turning paths of the wheels inscribe concentric arcs, is the distance between the center of the concentric arcs and a point central to the locations of the four wheels; thereby controlling the steering angle and speed of rotation of each wheel such as to perform steering/drive operations according to a steering mode M1, wherein the travel paths of the right and left rear wheels follow in the travel paths of the right and left front wheels, respectively.

12. A method of operating and electric vehicle having a left front, a right front, a left rear and a right rear wheel, and a plurality of steering and drive motors, comprising the step of:

controlling the rotation of each of the steering motors and drive motors in accordance with condition equations that can be expressed as $$\alpha_1 = \alpha_2 = \alpha_3 = \alpha_4$$

$$n_1 = n_2 = n_3 = n_4$$

where

α1, α2, α3, and α4 are the steering angles for the right front, left front, right rear, and left rear wheels, respectively;

n1, n2, n3, and n4 are the wheel rotation speeds for the right front, left front, right rear, and left rear wheels, respectively; thereby controlling the steering angle and speed of rotation of each wheel such as to perform steering/drive operations according to a steering mode M2, wherein the travel paths of the front and rear wheels lie parallel to each other.

13. An electric vehicle steering/drive control method for an electric vehicle wherein steering/drive control is effected through separate steering and drive motors for each of a left front, right front, left rear and right rear wheel, characterized in that the rotation of the steering motors and drive motors is controlled in accordance with condition equations that can be expressed as $$\alpha_1 = \frac{\pi}{2}$$

$$\alpha_2 = \tan^{-1}\left(\frac{L}{W}\right)$$

$$\alpha_3 = \alpha_4 = 0$$

$$n_1 : n_2 : n_3 : n_4 = \sqrt{W^2 + L^2} : 0 : W$$

for right turns, and $$\alpha_1 = \tan^{-1}\left(-\frac{L}{W}\right)$$

$$\alpha_2 = -\frac{\pi}{2}$$

$$\alpha_3 = \alpha_4 = 0$$

$$n_1 : n_2 : n_3 : n_4 = \sqrt{W^2 + L^2} : L : W : 0$$

for left turns, where

α1, α2, α3, and α4 are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between the front wheels and rear wheels;

W is the distance between each wheel and a center line Y between the right wheels and the left wheels; and, R, for the case wherein the turning paths of the wheels inscribe concentric arcs, is the distance between the center of the concentric arcs and a point central to the locations of the four wheels; thereby controlling the steering angle and speed of rotation of each wheel such as to perform steering/drive operations according to a steering mode M4, wherein the vehicle turns to the right with the right rear wheel as the center of rotation of the turn, and turns to the left with the left rear wheel as the center of rotation of the turn.

14. A method of operating and electric vehicle having a left front, a right front, a left rear and a right rear wheel, and a plurality of steering and drive motors, comprising the step of:

controlling the rotation of each of the steering motors and drive motors in accordance with condition equations that can be expressed as $$\alpha_1 = \alpha_2 = 0$$

$$\alpha_3 = -\frac{\pi}{2}$$

$$\alpha_4 = \tan^{-1}\left(-\frac{L}{W}\right)$$

$$n_1 : n_2 : n_3 : n_4 = 0 : W : L : \sqrt{W^2 + L^2}$$

for right turns, and $$\alpha_1 = \alpha_2 = 0$$

$$\alpha_3 = \tan^{-1}\left(\frac{L}{W}\right)$$

$$\alpha_4 = \frac{\pi}{2}$$

$$n_1 : n_2 : n_3 : n_4 = W : 0 : \sqrt{W^2 + L^2} : L$$

for left turns, where

α1, α2, α3, and α4 are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between the front wheels and rear wheels;

W is the distance between each wheel and a center line Y between the right wheels and the left wheels; and, R, for the case wherein the turning paths of the wheels inscribe concentric arcs, is the distance between the center of the concentric arcs and a point central to the locations of the four wheels; thereby controlling the steering angle and speed of rotation of each wheel such as to perform steering/drive operations according to a steering mode M5, wherein the vehicle turns to the right with the right front wheel as the center of rotation of the turn, and turns to the left with the left front wheel as the center of rotation of the turn.

15. An electric vehicle steering/drive control system wherein steering/drive control is effected through separate steering and drive motors for each of a left front, right front, left rear and right rear wheel, comprising:

a steering/drive command means, comprising a steering mode selection means for generating a steering mode select signal corresponding to a steering mode selected by a vehicle driver from among a plurality of different steering modes, comprising at least one of an M1 steering mode wherein the travel paths of the right and left rear wheels follow the travel paths of the right and left front wheels, respectively;

an M2 steering mode wherein the travel paths of the front and rear wheels lie parallel to each other;

an M3 steering mode wherein the rear wheel turning path relative to the front wheel turning path is an inside wheel difference path;

an M4 steering mode wherein the vehicle turns to the right with the right rear wheel as the center of rotation of the turn, and turns to the left with the left rear wheel as the center of rotation of the turn; and, an M5 steering mode wherein the vehicle turns to the right with the right front wheel as the center of rotation of the turn, and turns to the left with the left front wheel as the center of rotation of the turn;

a vehicle speed/direction command means for generating a vehicle speed/direction command signal responsive to operations performed by the driver;

a wheel steering angle computation means for receiving the steering mode select signal, and based on the vehicle speed and direction command signal, computing steering angles for the steering motors in accordance with condition equations required to perform steering/drive operations according to the select steering mode;

a wheel rotation speed computation means for receiving the steering mode select signal and, based on the vehicle speed/direction command signal, computing wheel rotation speeds for the drive motors in accordance with condition equations required for performing steering and drive according to the selected mode;

a steering motor control means for controlling rotation of the steering motors, based on the computed steering angles; and, a drive motor control means for controlling the rotation speeds of the drive motors, based on the computed rotation speeds, wherein the condition equations required to perform steering/drive operations according to the steering mode M1 can be expressed as the condition equations $$\alpha_1 = -\alpha_3 = \tan^{-1}\left(\frac{L}{R-W}\right)$$

$$\alpha_2 = -\alpha_4 = \tan^{-1}\left(\frac{L}{R+W}\right)$$

$$n_1:n_2:n_3:n_4 = \sqrt{(R-W)^2+L^2}:\sqrt{(R+W)^2+L^2}:\sqrt{(R-W)^2+L^2}:\sqrt{(R+W)^2+L^2}$$

where

α1, α2, α3, and α4 are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between the front wheels and rear wheels;

W is the distance between each wheel and a center line Y between the right wheels and the left wheels; and, R, for the case wherein the turning paths of the wheels inscribe concentric arcs, is the distance between the center of the concentric arcs and a point central to the locations of each wheel.

16. An electric vehicle steering/drive control system wherein steering/drive control is effected through separate steering and drive motors for each of a left front, right front, left rear and right rear wheel, comprising:

a steering/drive command means, comprising
a steering mode selection means for generating a steering mode select signal corresponding to a steering mode selected by a vehicle driver from among a plurality of different steering modes, comprising an M1 steering mode wherein the travel paths of the right and left rear wheels follow the travel paths of the right and left front wheels, respectively;

an M2 steering mode wherein the travel paths of the front and rear wheels lie parallel to each other;

an M3 steering mode wherein the rear wheel turning path relative to the front wheel turning path is an inside wheel difference path;

an M4 steering mode wherein the vehicle turns to the right with the right rear wheel as the center of rotation of the turn, and turns to the left with the left rear wheel as the center of rotation of the turn; and, an M5 steering mode wherein the vehicle turns to the right with the right front wheel as the center of rotation of the turn, and turns to the left with the left front wheel as the center of rotation of the turn;

a vehicle speed/direction command means for generating a vehicle speed/direction command signal responsive to operations performed by the driver;

a command signal rate-of-change suppression means for holding the rate-of-change of the vehicle speed/direction command signal to a value smaller than the lowest value of either a steering angle command following performance or a speed of rotation command following performance of the wheel, for generating an adjusted vehicle speed/direction command signal;

a wheel steering angle computation means for receiving the steering mode select signal and the adjusted vehicle speed/direction command signal, and computing steering angles for the steering motors, based on condition equations required to perform steering/drive operations according to the selected steering mode;

a wheel rotation speed computation means for receiving the steering mode select signal and the adjusted vehicle speed/direction command signal, and computing, therefrom, wheel rotation speeds based on the condition equations required to perform steering/drive operations according to the selected steering mode;

a steering motor control means for controlling rotation of the steering motors based on the computed steering angles; and, a drive motor control means for controlling rotation of the drive motors based on the computed rotation speeds, wherein the condition equations required to perform steering/drive operations according to the steering mode M1 can be expressed as the condition equations $$\alpha_1 = -\alpha_3 = \tan^{-1}\left(\frac{L}{R-W}\right)$$

$$\alpha_2 = -\alpha_4 = \tan^{-1}\left(\frac{L}{R+W}\right)$$

$$n_1:n_2:n_3:n_4 = \sqrt{(R-W)^2+L^2}:\sqrt{(R+W)^2+L^2}:\sqrt{(R-W)^2+L^2}:\sqrt{(R+W)^2+L^2}$$

where

α1, α2, α3, and α4 are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between the front wheels and rear wheels;

W is the distance between each wheel and a center line Y between the right wheels and the left wheels; and, R, for the case wherein the turning paths of the wheels inscribe concentric arcs, is the distance between the center of the concentric arcs and a point central to the locations of the four wheels.

17. An electric vehicle steering/drive control system wherein steering/drive control is effected through separate steering and drive motors for each of a left front, right front, left rear and right rear wheels, comprising:

a steering/drive command means, comprising a steering mode selection means for generating a steering mode select signal corresponding to a steering mode selected by a vehicle driver from among a plurality of different steering modes, comprising at least one of an M1 steering mode wherein the travel paths of the right and left rear wheels follow the travel paths of the right and left front wheels, respectively;

an M2 steering mode wherein the travel paths of the front and rear wheels lie parallel to each other;

an M3 steering mode wherein the rear wheel turning path relative to the front wheel turning path is an inside wheel difference path;

an M4 steering mode wherein the vehicle turns to the right with the right rear wheel as the center of rotation of the turn, and turns to the left with the left rear wheel as the center of rotation of the turn; and, an M5 steering mode wherein the vehicle turns to the right with the right front wheel as the center of rotation of the turn, and turns to the left with the left front wheel as the center of rotation of the turn;

a vehicle speed/direction command means for generating a vehicle speed/direction command signal responsive to operations performed by the driver;

a wheel steering angle computation means for receiving the steering mode select signal, and based on the vehicle speed and direction command signal, computing steering angles for the steering motors in accordance with condition equations required to perform steering/drive operations according to the selected steering mode;

a wheel rotation speed computation means for receiving the steering mode select signal and, based on the vehicle speed/direction command signal, computing wheel rotation speeds for the drive motors in accordance with condition equations required for performing steering and drive according to the selected mode;

a steering motor control means for controlling rotation of the steering motors, based on the computed steering angles; and, a drive motor control means for controlling the rotation speeds of the drive motors, based on the computed rotation speeds, wherein the condition equations required to perform steering/drive operations according to the steering mode M2 can be expressed as the condition equations $$\alpha_1=\alpha_2=\alpha_3=\alpha_4$$

$$n_1=n_2=n_3=n_4$$

where

α1, α2, α3, and α4 are the steering angles for the right front, left front, right rear, and left rear wheels, respectively; and, n1, n2, n3, and n4 are the wheel rotation speeds for the right front, left front, right rear, and left rear wheels, respectively.

18. An electric vehicle steering/drive control system wherein steering/drive control is effected through separate steering and drive motors for each of a left front, right front, left rear and right rear wheel, comprising:

a steering/drive command means, comprising a steering mode selection means for generating a steering mode select signal corresponding to a steering mode selected by a vehicle driver from among a plurality of different steering modes, comprising an M1 steering mode wherein the travel paths of the right and left rear wheels follow the travel paths of the right and left front wheels, respectively;

an M2 steering mode wherein the travel paths of the front and rear wheels lie parallel to each other;

an M3 steering mode wherein the rear wheel turning path relative to the front wheel turning path is an inside wheel difference path;

an M4 steering mode wherein the vehicle turns to the right with the right rear wheel as the center of rotation of the turn, and turns to the left with the left rear wheel as the center of rotation of the turn; and, an M5 steering mode wherein the vehicle turns to the right with the right front wheel as the center of rotation of the turn, and turns to the left with the left front wheel as the center of rotation of the turn;

a vehicle speed/direction command means for generating a vehicle speed/direction command signal responsive to operations performed by the driver;

a command signal rate-of-change suppression means for holding the rate-of-change of the vehicle speed/direction command signal to a value smaller than the lowest value of either a steering angle command following performance or a speed of rotation command following performance of the wheels, for generating an adjusted vehicle speed/direction command signal;

a wheel steering angle computation means for receiving the steering mode select signal and the adjusted vehicle speed/direction command signal, and computing steering angles for the steering motors, based on condition equations required to perform steering/drive operations according to the selected steering mode;

a wheel rotation speed computation means for receiving the steering mode select signal and the adjusted vehicle speed/direction command signal, and computing, therefrom, wheel rotation speeds based on the condition equations required to perform steering/drive operations according to the selected steering mode;

a steering motor control means for controlling rotation of the steering motors based on the computed steering angles; and, a drive motor control means for controlling rotation of the drive motors based on the computed rotation speeds, wherein the condition equations required to perform steering/drive operations according to the steering mode M2 can be expressed as the condition equations $$\alpha_1 = \alpha_2 = \alpha_3 = \alpha_4$$
$$n_1 = n_2 = n_3 = n_4$$

where

α1, α2, α3, and α4 are the steering angles for the right front, left front, right rear, and left rear wheels, respectively; and, n1, n2, n3, and n4 are the wheel rotation speeds for the right front, left front, right rear, and left rear wheels, respectively.

19. An electric vehicle steering/drive control system wherein steering/drive control is effected through separate steering and drive motors for each of a left front, right front, left rear and right rear wheel, comprising:

a steering/drive command means, comprising
a steering mode selection means for generating a steering mode select signal corresponding to a steering mode selected by a vehicle driver from among a plurality of different steering modes, comprising at least one of
an M1 steering mode wherein the travel paths of the right and left rear wheels follow the travel paths of the right and left front wheels, respectively;
an M2 steering mode wherein the travel paths of the front and rear wheels lie parallel to each other;
an M3 steering mode wherein the rear wheel turning path relative to the front wheel turning path is an inside wheel difference path;
an M4 steering mode wherein the vehicle turns to the right with the right rear wheel as the center of rotation of the turn, and turns to the left with the left rear wheel as the center of rotation of the turn; and,
an M5 steering mode wherein the vehicle turns to the right with the right front wheel as the center of rotation of the turn, and turns to the left with the left front wheel as the center of rotation of the turn;
a vehicle speed/direction command means for generating a vehicle speed/direction command signal responsive to operations performed by the driver;
a wheel steering angle computation means for receiving the steering mode select signal, and based on the vehicle speed and direction command signal, computing steering angles for the steering motors in accordance with condition equations required to perform steering/drive operations according to the selected steering mode;
a wheel rotation speed computation means for receiving the steering mode select signal and, based on the vehicle speed/direction command signal, computing wheel rotation speeds for the drive motors in accordance with condition equations required for performing steering and drive accordance to the selected mode;
a steering motor control means for controlling rotation of the steering motors, based on the computed steering angles; and,
a drive motor control means for controlling the rotation speeds of the drive motors, based on the computed rotation speeds, wherein the condition equations required to perform steering/drive operations according to the steering mode M3 can be expressed as the condition equations $$\alpha_1 = \tan^{-1}\left(\frac{2L}{R-W}\right)$$

$$\alpha_2 = \tan^{-1}\left(\frac{2L}{R+W}\right)$$

$$\alpha_3 = \alpha_4 = 0$$

$$n_1:n_2:n_3:n_4 = \sqrt{(R-W)^2+(2L)^2}:\sqrt{(R+W)^2+(2L)^2}:|R-W|:|R+W|.$$

where

α1, α2, α3, and α4 are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between the front wheels and rear wheels;

W is the distance between each wheel and a center line Y between right wheels and the left wheels; and, R, for the case wherein the turning paths of the wheels inscribe concentric arcs, is the distance between the center of the concentric arcs and a point central to the locations of the four wheels.

20. An electric vehicle steering/drive control system wherein steering/drive control is effected through separate steering and drive motors for each of a left front, right front, left rear and right rear wheel, comprising:

a steering/drive command means, comprising
a steering mode selection means for generating a steering mode select signal corresponding to a steering mode selected by a vehicle driver from among a plurality of different steering modes, comprising
an M1 steering mode wherein the travel paths of the right and left rear wheels follow the travel paths of the right and left front wheels, respectively;
an M2 steering mode wherein the travel paths of the front and rear wheels lie parallel to each other;
an M3 steering mode wherein the rear wheel turning path relative to the front wheel turning path is an inside wheel difference path;
an M4 steering mode wherein the vehicle turns to the right with the right rear wheel as the center of rotation of the turn, and turns to the left with the left rear wheel as the center of rotation of the turn; and
an M5 steering mode wherein the vehicle turns to the right with the right front wheel as the center of rotation of the turn, and turns to the left with the left front wheel as the center of rotation of the turn;
a vehicle speed/direction command means for generating a vehicle speed/direction command signal responsive to operations performed by the driver;
a command signal rate-of-change suppression means for holding the rate-of-change of the vehicle speed/direction command signal to a value smaller than the lowest value of either a steering angle command following performance or a speed of rotation command following performance of the wheel, for generating an adjusted vehicle speed/direction command signal;

a wheel steering angle computation means for receiving the steering mode select signal and the adjusted vehicle speed/direction command signal, and computing steering angles for the steering motors, based on condition equations required to perform steering/drive operations according to the selected steering mode;

a wheel rotation steed computation means for receiving the steering mode select signal and the adjusted vehicle speed/direction command signal, and computing, therefrom, wheel rotation speeds based on the condition equations required to perform steering/drive operations according to the selected steering mode;

a steering motor control means for controlling rotation of the steering motors based on the computed steering angles; and, a drive motor control means for controlling rotation of the drive motors based on the computed rotation speeds, wherein the condition equations required to perform steering/drive operations according to the steering mode M3 can be expressed as the condition equations $$\alpha_1 = \tan^{-1}\left(\frac{2L}{R-W}\right)$$

$$\alpha_2 = \tan^{-1}\left(\frac{2L}{R+W}\right)$$

$\alpha_3 = \alpha_4 = 0$ $n_1:n_2:n_3:n_4 = \sqrt{(R-W)^2+(2L)^2}:\sqrt{(R+W)^2+(2L)^2}:|R-W|:|R+W|$ where
- $\alpha_1$, $\alpha_2$, $\alpha_3$, and $\alpha_4$ are the steering angles for the right front, left front, right rear, and left rear wheels, respectively;
- $n_1$, $n_2$, $n_3$, and $n_4$ are the wheel rotation speeds for the right front, left front, right rear, and left rear wheels, respectively;
- L is the distance between each wheel and a center line X between the front wheels and rear wheels;
- W is the distance between each wheel and a center line Y between the right wheels and the left wheels; and,
- R, for the case wherein the turning paths of the wheels inscribe concentric arcs, is the distance between the center of the concentric arcs and a point central to the locations of the four wheels.

21. An electric vehicle steering/drive control system wherein steering/drive control is effected through separate steering and drive motors for each of a left front, right front, left rear and right rear wheel, comprising:

a steering/drive command means, comprising
   a steering mode selection means for generating a steering mode select signal corresponding to a steering mode selected by a vehicle driver from among a plurality of different steering modes, comprising at least one of
      an M1 steering mode wherein the travel paths of the right and left rear wheels follow the travel paths of the right and left front wheels, respectively;
      an M2 steering mode wherein the travel paths of the front and rear wheels lie parallel to each other;
      an M3 steering mode wherein the rear wheel turning path relative to the front wheel turning path is an inside wheel difference path;
      an M4 steering mode wherein the vehicle turns to the right with the right rear wheel as the center of rotation of the turn, and turns to the left with the left rear wheel as the center of rotation of the turn; and,
      an M5 steering mode wherein the vehicle turns to the right with the right front wheel as the center of rotation of the turn, and turns to the left with the left front wheel as the center of rotation of the turn;

a vehicle speed/direction command means for generating a vehicle speed/direction command signal responsive to operations performed by the driver;

a wheel steering angle computation means for receiving the steering mode select signal, and based on the vehicle speed and direction command signal, computing steering angles for the steering motors in accordance with condition equations required to perform steering/drive operations according to the selected steering mode;

a wheel rotation speed computation means for receiving the steering mode select signal and, based on the vehicle speed/direction command signal, computing wheel rotation speeds for the drive motors in accordance with condition equations required for performing steering and drive according to the selected mode;

a steering motor control means for controlling rotation of the steering motors, based on the computed steering angles; and, a drive motor control means for controlling the rotation speeds of the drive motors, based on the computed rotation speeds, wherein the condition equations required to perform steering/drive operations according to the steering mode M4 can be expressed as $$\alpha_1 = \frac{\pi}{2}$$

$$\alpha_2 = \tan^{-1}\left(\frac{L}{W}\right)$$

$\alpha_3 = \alpha_4 = 0$ $n_1:n_2:n_3:n_4 = L:\sqrt{W^2+L^2}:0:W$ for right turns, and $$\alpha_1 = \tan^{-1}\left(-\frac{L}{W}\right)$$

$$\alpha_2 = -\frac{\pi}{2}$$

$\alpha_3 = \alpha_4 = 0$ $n_1:n_2:n_3:n_4 = \sqrt{W^2+L^2}:L:W:0$ for left turns, where
- $\alpha_1$, $\alpha_2$, $\alpha_3$, and $\alpha_4$ are the steering angles for the right front, left front, right rear, and left rear wheels, respectively;
- $n_1$, $n_2$, $n_3$, and $n_4$ are the wheel rotation speeds for the right front, left front, right rear, and left rear wheels, respectively;
- L is the distance between each wheel and a center line X between the front wheels and rear wheels; and,
- W is the distance between each wheel and a center line Y between right wheels and the left wheels.

22. An electric vehicle steering/drive control system wherein steering/drive control is effected through separate steering and drive motors for each of a left front, right front, left rear and right rear wheel, comprising:
- a steering/drive command means, comprising
  - a steering mode selection means for generating a steering mode select signal corresponding to a steering mode selected by a vehicle driver from among a plurality of different steering modes, comprising
    - an M1 steering mode wherein the travel paths of the right and left rear wheels follow the travel paths of the right and left front wheels, respectively;
    - an M2 steering mode wherein the travel paths of the front and rear wheels lie parallel to each other;
    - an M3 steering mode wherein the rear wheel turning path relative to the front wheel turning path is an inside wheel difference path;
    - an M4 steering mode wherein the vehicle turns to the right with the right rear wheel as the center of rotation of the turn, and turns to the left with the left rear wheel as the center of rotation of the turn; and,
    - an M5 steering mode wherein the vehicle turns to the right with the right front wheel as the center of rotation of the turn, and turns to the left with the left front wheel as the center of rotation of the turn;
  - a vehicle speed/direction command mean for generating a vehicle speed/direction command signal responsive to operations performed by the driver;
- a command signal rate-of-change suppression means for holding the rate-of-change of the vehicle speed/direction command signal to a value smaller than the lowest value of either a steering angle command following performance or a speed of rotation command following performance of the wheels, for generating an adjusted vehicle speed/direction command signal;
- a wheel steering angle computation means for receiving the steering mode select signal and the adjusted vehicle speed/direction command signal, an computing steering angles for the steering motors, based on condition equation required to perform steering/drive operations according to the selected steering mode;
- a wheel rotation speed computation means for receiving the steering mode select signal and the adjusted vehicle speed/direction command signal, an computing, therefrom, wheel rotation speeds based on the condition equations required to perform steering/drive operations according to the selected steering mode;
- a steering motor control means for controlling rotation of the steering motors based on the computed steering angles; and,
- a drive motor control means for controlling rotation of the drive motors based on the computed rotation speeds,
- wherein the condition equations required to perform steering/drive operations according to the steering mode M4 can be expressed as $$\alpha_1 = \frac{\pi}{2}$$

$$\alpha_2 = \tan^{-1}\left(\frac{L}{W}\right)$$

$$\alpha_3 = \alpha_4 = 0$$

$$n_1:n_2:n_3:n_4 = L:\sqrt{W^2+L^2}:0:W$$

for right turns, and $$\alpha_1 = \tan^{-1}\left(-\frac{L}{W}\right)$$

$$\alpha_2 = -\frac{\pi}{2}$$

$$\alpha_3 = \alpha_4 = 0$$

$$n_1:n_2:n_3:n_4 = \sqrt{W^2+L^2}:L:W:0$$

for left turns, where
- $\alpha_1$, $\alpha_2$, $\alpha_3$, and $\alpha_4$ are the steering angles for the right front, left front, right rear, and left rear wheels, respectively;
- $n_1$, $n_2$, $n_3$, and $n_4$ are the wheel rotation speeds for the right front, left front, right rear, and left rear wheels, respectively;
- L is the distance between each wheel and a center line X between the front wheels and rear wheels; and,
- W is the distance between each wheel and a center line Y between the right wheels and the left wheels.

23. An electric vehicle steering/drive control system wherein steering/drive control is effected through separate steering and drive motors for each of a left front, right front, left rear and right rear wheel, comprising:
- a steering/drive command means, comprising
  - a steering mode selection means for generating a steering mode select signal corresponding to a steering mode selected by a vehicle driver from among a plurality of different steering mode, comprising at least one of
    - an M1 steering mode wherein the travel paths of the right and left rear wheels follow the travel paths of the right and left front wheels, respectively;
    - an M2 steering mode wherein the travel paths of the front and rear wheels lie parallel to each other;
    - an M3 steering mode wherein the rear wheel turning path relative to the front wheel turning path is an inside wheel difference path;
    - an M4 steering mode wherein the vehicle turns to the right with the right rear wheel as the center of rotation of the turn, and turns to the left with the left rear wheel as the center of rotation of the turn; and,
    - an M5 steering mode wherein the vehicle turns to the right with the right front wheel as the center of rotation of the turn, and turns to the left with the left front wheel as the center of rotation of the turn;
  - a vehicle speed/direction command means for generating a vehicle speed/direction command signal responsive to operations performed by the driver;
- a wheel steering angle computation means for receiving the steering mode select signal, and based on the vehicle speed and direction command signal, computing steering angles for the steering motors in accordance with condition equations required to perform steering/drive operations according to the selected steering mode;
- a wheel rotation speed computation means for receiving the steering mode select signal and, based on the vehicle speed/direction command signal, computing wheel rotation speeds for the drive motors in accordance with condition equations required for performing steering and drive according to the selected mode;

a steering motor control means for controlling rotation of the steering motors, based on the computed steering angles; and, a drive motor control means for controlling the rotation speeds of the drive motors, based on the computed rotation speeds, wherein the condition equations required to perform steering/drive operations according to the M5 steering mode can be expressed as $$\alpha_1 = \alpha_2 = 0$$

$$\alpha_3 = -\frac{\pi}{2}$$

$$\alpha_4 = \tan^{-1}\left(-\frac{L}{W}\right)$$

$$n_1:n_2:n_3:n_4 = 0:W:L:\sqrt{W^2+L^2}$$

for right turns, and $$\alpha_1 = \alpha_2 = 0$$

$$\alpha_3 = \tan^{-1}\left(\frac{L}{W}\right)$$

$$\alpha_4 = \frac{\pi}{2}$$

$$n_1:n_2:n_3:n_4 = W:0:\sqrt{W^2+L^2}:L$$

for left turns, where $\alpha 1$, $\alpha 2$, $\alpha 3$, and $\alpha 4$ are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between the front wheels and rear wheels; and, W is the distance between each wheel and a center line Y between the right wheels and the left wheels.

24. An electric vehicle steering/drive control system wherein steering/drive control is effected through separate steering and drive motors for each of a left front, right front, left rear and right rear wheel, comprising:

a steering/drive command means, comprising a steering mode selection means for generating a steering mode select signal corresponding to a steering mode selected by a vehicle driver from among a plurality of different steering modes, comprising an M1 steering mode wherein the travel paths of the right and left rear wheels follow the travel paths of the right and left front wheels, respectively;

an M2 steering mode wherein the travel paths of the front and rear wheels lie parallel to each other;

an M3 steering mode wherein the rear wheel turning path relative to the front wheel turning path is an inside wheel difference path;

an M4 steering mode wherein the vehicle turns to the right with the right rear wheel as the center of rotation of the turn, and turns to the left with the left rear wheel as the center of rotation of the turn; and, an M5 steering mode wherein the vehicle turns to the right with the right front wheel as the center of rotation of the turn, and turns to the left with the left front wheel as the center of rotation of the turn;

a vehicle speed/direction command means for generating a vehicle speed/direction command signal responsive to operations performed by the driver;

a command signal rate-of-change suppression means for holding the rate-of-change of the vehicle speed/direction command signal to a value smaller than the lowest value of either a steering angle command following performance or a speed of rotation command following performance of the wheels, for generating an adjusted vehicle speed/direction command signal;

a wheel steering angle computation means for receiving the steering mode select signal and the adjusted vehicle speed/direction command signal, and computing steering angles for the steering motors, based on condition equations required to perform steering/drive operations according to the selected steering mode;

a wheel rotation speed computation means for receiving the steering mode select signal and the adjusted vehicle speed/direction command signal, and computing, therefrom, wheel rotation speeds based on the condition equations required to perform steering/drive operations according to the selected steering mode;

a steering motor control means for controlling rotation of the steering motors based on the computed steering angles; and, a drive motor control means for controlling rotation of the drive motors based on the computed rotation speeds, wherein the condition equations required to perform steering/drive operations according to the M5 steering mode can be expressed as $$\alpha_1 = \alpha_2 = 0$$

$$\alpha_3 = -\frac{\pi}{2}$$

$$\alpha_4 = \tan^{-1}\left(-\frac{L}{W}\right)$$

$$n_1:n_2:n_3:n_4 = 0:W:L:\sqrt{W^2+L^2}$$

for right turns, and $$\alpha_1 = \alpha_2 = 0$$

$$\alpha_3 = \tan^{-1}\left(\frac{L}{W}\right)$$

$$\alpha_4 = \frac{\pi}{2}$$

$$n_1:n_2:n_3:n_4 = W:0:\sqrt{W^2+L^2}:L$$

for left turns, where $\alpha 1$, $\alpha 2$, $\alpha 3$, and $\alpha 4$ are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between the front wheels and rear wheels; and, W is the distance between each wheel and a center line Y between the right wheels and the left wheels.

25. An electric vehicle steering/drive control system for controlling an electric vehicle in which steering/drive control is effected through separate steering and drive motors for each of a left front, right front, left rear and right rear wheel, comprising:

a vehicle speed/direction command means for generating a vehicle speed/direction command signal responsive to operations performed by the driver of the vehicle;

a wheel steering angle computation means for computing steering angles for the steering motors, based on the vehicle speed/direction command signal, and based on condition equations required for performing steering/drive operations according to an M1 steering mode in which the condition equations required to perform steering/drive operations according to the M1 steering mode can be expressed as $$\alpha_1 = -\alpha_3 = \tan^{-1}\left(\frac{L}{R-W}\right)$$

$$\alpha_2 = -\alpha_4 = \tan^{-1}\left(\frac{L}{R+W}\right)$$

$$n_1:n_2:n_3:n_4 = \sqrt{(R-W)^{2}+L^{2}}:\sqrt{(R+W)^{2}+L^{2}}:\sqrt{(R-W)^{2}+L^{2}}:\sqrt{(R+W)^{2}+L^{2}}$$

where $\alpha 1$, $\alpha 2$, $\alpha 3$, and $\alpha 4$ are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between the front wheels and rear wheels;

W is the distance between each wheel and a center line Y between the right wheels and the left wheels; and, R, for the case wherein the turning paths of the wheels inscribe concentric arcs, is the distance between the center of the concentric arc and a point central to the locations of the four wheels, wherein the travel paths of the right and left rear wheels follow the travel paths of the right and left front wheels, respectively;

a wheel rotation speed computation means for computing wheel rotation speeds for each of the drive motors, based on the vehicle speed/direction command signal and the condition equations required to perform steering/drive operations according to the M1 steering mode;

a steering motor control means for controlling rotation of the steering motors, based on the computed steering angles; and a drive motor control means for controlling rotation of the drive motors, based on the computed rotation speeds.

26. An electric vehicle steering/drive control system in which steering/drive control is effected through separate steering and drive motors for each of a left front, right front, left rear and right rear wheel, comprising:

a vehicle speed/direction command means for generating a vehicle speed/direction command signal responsive to operations performed by the driver;

a wheel steering angle computation means for computing steering angles for the steering motors, based on the vehicle speed/direction command signal, and based on the condition equations required to perform steering/drive operations according to an M2 steering mode in which the condition equations required to perform steering/drive operations according to the M2 steering mode are $$\alpha 1 = \alpha 2 = \alpha 3 = \alpha 4$$

$$n1 = n2 = n3 = n4.$$

where $\alpha 1$, $\alpha 2$, $\alpha 3$, and $\alpha 4$ are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between the front wheels and rear wheels;

W is the distance between each wheel and a center line Y between the right wheels and the left wheels; and, R, for the case wherein the turning paths of the wheels inscribe concentric arcs, is the distance between the center of the concentric arcs and a point central to the locations of the four wheels, wherein the travel paths of the front and rear wheels lie parallel to each other;

a wheel rotation speed computation means for computing wheel rotation speeds for each of the drive motors, based on the vehicle speed/direction command signal and the condition equations required to perform steering/drive operations according to the M2 steering mode;

a steering motor control means for controlling rotation of the steering motors, based on the computed steering angles; and a drive motor control means for controlling rotation of the drive motors, based on the computed rotation speeds.

27. An electric vehicle steering/drive control system wherein steering/drive control is effected through separate steering and drive motors for each of a left front, right front, left rear and right rear wheel, comprising:

a vehicle speed/direction command means for generating a vehicle speed/direction command signal responsive to operations performed by the driver;

a wheel steering angle computation means for computing steering angles for the steering motors, based on the vehicle speed/direction command signal, and based on condition equations required to perform steering/drive operations according to an M4 steering mode in which the condition equations required to perform steering/drive operations according to the M4 steering mode can be expressed as $$\alpha_1 = \frac{\pi}{2}$$

$$\alpha_2 = \tan^{-1}\left(\frac{L}{W}\right)$$

$$\alpha_3 = \alpha_4 = 0$$

$$n_1:n_2:n_3:n_4 = L:\sqrt{W^{2}+L^{2}}:0:W$$

for right turns, and $$\alpha_1 = \tan^{-1}\left(-\frac{L}{W}\right)$$
$$\alpha_2 = -\frac{\pi}{2}$$
$$\alpha_3 = \alpha_4 = 0$$
$$n_1:n_2:n_3:n_4 = \sqrt{W^2+L^2}:L:W:0$$

for left turns, where

α1, α2, α3, and α4 are the steering angles for the right front, left front, right rear, and left rear wheels, respectively;

n1, n2, n3, and n4 are the wheel rotation speeds for the right front, left front, right rear, and left rear wheels, respectively;

L is the distance between each wheel and a center line X between the front wheels and rear wheels; and, W is the distance between each wheel and a center line Y between the right wheels and the left wheels, wherein the vehicle turns to the right with the right rear wheel as the center of rotation of the turn, and turns to the left with the left rear wheel as the center of rotation of the turn;

a wheel rotation speed computation means for computing wheel rotation speeds for each of the drive motors, based on the vehicle speed/direction command signal and the condition equations required to perform steering/drive operations according to the M4 steering mode;

a steering motor control means for controlling rotation of the steering motors, based on the computed steering angles; and, a drive motor control means for controlling rotation of the drive motors, based on the computed rotation speeds.

28. An electric vehicle steering/drive control system in which steering/drive control is effected through separate steering and drive motors for each of a left front, right front, left rear and right rear wheel, comprising:

a vehicle speed/direction command means for generating a vehicle speed/direction command signal responsive to operations performed by the driver;

a wheel steering angle computation means for computing steering angles for the steering motors, based on the vehicle speed/direction command signal, and based on condition equations required to perform steering/drive operations according to an M5 steering mode in which the condition equations required to perform steering/drive operations according to the M5 steering mode can be expressed as $$\alpha_1 = \alpha_2 = 0$$
$$\alpha_3 = -\frac{\pi}{2}$$
$$\alpha_4 = \tan^{-1}\left(-\frac{L}{W}\right)$$
$$n_1:n_2:n_3:n_4 = 0:W:L:\sqrt{W^2+L^2}$$

for right turns, and $$\alpha_1 = \alpha_2 = 0$$
$$\alpha_3 = \tan^{-1}\left(\frac{L}{W}\right)$$
$$\alpha_4 = \frac{\pi}{2}$$
$$n_1:n_2:n_3:n_4 = W:0:\sqrt{W^2+L^2}:L$$

for left turns, where

α1, α2, α3, and α4 are the steering angles for the right front left front, right rear, and left rear wheels, respectively;

n1, n2, n3, and n4 are the wheel rotation speeds for the right front, left front, right rear, and left rear wheels, respectively;

L is the distance between each wheel and a center line X between the front wheels and rear wheels; and, W is the distance between each wheel and a center line Y between the right wheels and the left wheels, wherein the vehicle turns to the right with the right front wheel as the center of rotation of the turn, and turns to the left with the left front wheel as the center of rotation of the turn;

a wheel rotation speed computation means for computing wheel rotation speeds for each of the drive motors, based on the vehicle speed/direction command signal and the condition equations required to perform steering/drive operations according to the M5 steering mode;

a steering motor control means for controlling rotation of the steering motors, based on the computed steering angles; and, a drive motor control means for controlling rotation of the drive motors, based on the computed rotation speeds.

* * * * *